United States Patent [19]
Usami et al.

[11] Patent Number: 5,469,266
[45] Date of Patent: Nov. 21, 1995

[54] COLOR IMAGE PROCESSING APPARATUS WHICH USES DIFFERENT SCREEN ANGLES FOR DIFFERENT COLOR COMPONENTS

[75] Inventors: Akihiro Usami; Yoshinori Mochida, both of Yokohama; Atsutomo Yoshizawa; Yoshinori Ikeda, both of Kawasaki; Kazuhisa Kemmochi, Machida; Yukio Nagase, Kawasaki; Shinobu Arimoto, Yokohama; Masanori Yamada, Kawasaki; Hajime Suzuki, Yokohama; Katsuhito Kato, Kawasaki, all of Japan

[73] Assignee: Canon Kabushiki Kaisha, Tokyo, Japan

[21] Appl. No.: 259,123

[22] Filed: Jun. 13, 1994

Related U.S. Application Data

[63] Continuation of Ser. No. 945,584, Sep. 16, 1992, abandoned, which is a continuation of Ser. No. 642,279, Jan. 15, 1991, abandoned.

[30] Foreign Application Priority Data

| Jan. 19, 1990 | [JP] | Japan | 2-8370 |
| Jan. 26, 1990 | [JP] | Japan | 2-16555 |
| Jan. 26, 1990 | [JP] | Japan | 2-16561 |
| Feb. 2, 1990 | [JP] | Japan | 2-22238 |
| Jul. 10, 1990 | [JP] | Japan | 2-181771 |

[51] Int. Cl.$^6$ ............... H04N 1/40; H04N 1/52; G03G 15/01
[52] U.S. Cl. ............... 358/298; 358/300; 358/536; 347/232
[58] Field of Search ............... 358/298, 300, 358/454, 456, 459, 518, 530, 534, 536; 346/108, 160; 347/129, 224, 232

[56] References Cited

U.S. PATENT DOCUMENTS

| 4,149,183 | 4/1979 | Pellar et al. | 358/75 |
| 4,185,304 | 1/1980 | Holladay | 358/298 |
| 4,196,451 | 4/1980 | Pellar | 358/75 |
| 4,507,685 | 3/1985 | Kawamura | 358/283 |
| 4,783,837 | 11/1988 | Kawamura et al. | 382/50 |
| 4,800,442 | 1/1989 | Riseman et al. | 358/280 |
| 4,868,684 | 9/1989 | Suzuki | 358/455 |
| 4,870,499 | 9/1989 | Suzuki et al. | 358/443 |
| 4,897,734 | 1/1990 | Sato et al. | 358/448 |
| 4,918,622 | 4/1990 | Granger et al. | 358/298 X |
| 4,926,248 | 5/1990 | Kobayashi et al. | 358/75 |
| 4,974,067 | 11/1990 | Suzuki | 358/458 X |
| 4,980,757 | 12/1990 | Nishigaki | 358/75 |
| 5,172,132 | 12/1992 | Haneda et al. | 358/296 X |

FOREIGN PATENT DOCUMENTS

| 63-9275 | 1/1987 | Japan . |
| 62-183670 | 8/1987 | Japan . |
| 62-183676 | 8/1987 | Japan . |
| 62-183680 | 8/1987 | Japan . |
| 62-198266 | 9/1987 | Japan . |
| 62-230163 | 10/1987 | Japan . |

*Primary Examiner*—Peter S. Wong
*Assistant Examiner*—Eric Frahm
*Attorney, Agent, or Firm*—Fitzpatrick, Cella, Harper & Scinto

[57] ABSTRACT

A color image processing apparatus for sequentially inputting image data which corresponds to each of a plurality of color components in units of pixels of a predetermined quantity, delaying, with respect to a reference phase, at least the first color component or the last color component and sequentially forming image in the units of pixels of a predetermined quantity in accordance with the delay.

26 Claims, 45 Drawing Sheets

FIRST COLOR
FIRST LINE 
SECOND LINE 
THIRD LINE 
FOURTH LINE 
FIG. 6A
(PRIOR ART)
SECOND COLOR
FIRST LINE 
SECOND LINE 
THIRD LINE 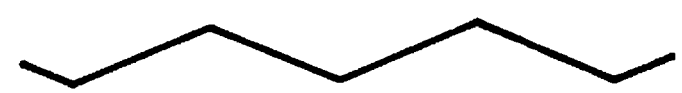
FOURTH LINE 
FIG. 6B
(PRIOR ART)

FIRST COLOR

SECOND COLOR

NO DEVIATION

○ : FIRST COLOR
× : SECOND COLOR

DEVIATION BY ONE PIXEL
(MAIN SCANNING DIRECTION)

○ : FIRST COLOR
× : SECOND COLOR

MAIN SCANNING DIRECTION

SUB — SCANNING DIRECTION $l_1 = l_2 = l_3 = l_4$

M : 45°   FIRST COLOR

FIG. 14A

C : 0°   SECOND COLOR

FIG. 14B

Y : 0°   THIRD COLOR

FIG. 14C

BK : 26.6°   FOURTH COLOR

FIG. 14D

FIRST COLOR : 45°

| o | o | o | o | o |
|---|---|---|---|---|
|   | o | o | o | o |   |
| o | o | o | o | o |
|   | o | o | o | o |   |
| o | o | o | o | o |

SECOND COLOR : 0°

| o | o | o | o | o |
|---|---|---|---|---|
| o | o | o | o | o |
| o | o | o | o | o |
| o | o | o | o | o |
| o | o | o | o | o |

M :26.6°  FIRST COLOR

FIG. 17A

C :-26.6°  SECOND COLOR

FIG. 17B

Y : 0°  THIRD COLOR

FIG. 17C

FIRST COLOR: 26.6°

FIG. 19A

SECOND COLOR: -26.6°

FIG. 19B

FIRST LINE 
SECOND LINE 
THIRD LINE 
FOURTH LINE 
FIG. 25A
FIRST LINE 
SECOND LINE 
THIRD LINE 
FOURTH LINE 
FIG. 25B

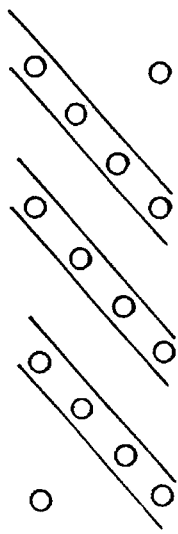
FIG. 27B
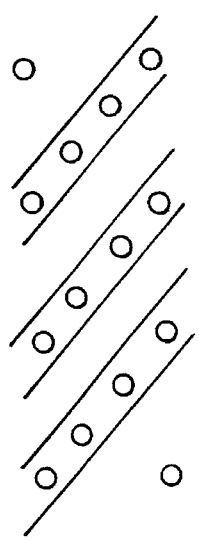
FIG. 27A
| FIRST COLOR | | | | | |
|---|---|---|---|---|---|
| 11 | 4 | 7 | 10 | 1 | 6 |
| 3 | 8 | 9 | 2 | 5 | 12 |
| 7 | 10 | 1 | 6 | 11 | 4 |
| 9 | 2 | 5 | 12 | 3 | 8 |
| 1 | 6 | 11 | 4 | 7 | 10 |
| 5 | 12 | 3 | 8 | 9 | 2 |
FIG. 28A
| SECOND COLOR | | | | | |
|---|---|---|---|---|---|
| 11 | 6 | 1 | 10 | 7 | 4 |
| 3 | 12 | 5 | 2 | 9 | 8 |
| 7 | 4 | 11 | 6 | 1 | 10 |
| 9 | 8 | 3 | 12 | 5 | 2 |
| 1 | 10 | 7 | 4 | 11 | 6 |
| 5 | 2 | 9 | 8 | 3 | 12 |
FIG. 28B
| THIRD COLOR | | | | | |
|---|---|---|---|---|---|
| 11 | 12 | 11 | 12 | 11 | 12 |
| 3 | 4 | 3 | 4 | 3 | 4 |
| 7 | 8 | 7 | 8 | 7 | 8 |
| 9 | 10 | 9 | 10 | 9 | 10 |
| 1 | 2 | 1 | 2 | 1 | 2 |
| 5 | 6 | 5 | 6 | 5 | 6 |
FIG. 28C

CYAN (C) PERIOD...2PIXELS

BLACK (BK) PERIOD...3PIXELS

MAGENTA (M) PERIOD...2PIXELS

YELLOW (Y) PERIOD...3PIXELS

OVERLAPPING OF
M AND C

OVERLAPPING OF
C AND Y

OVERLAPPING OF
Y AND M

CYAN (C) PERIOD···2PIXELS

BLACK (BK) PERIOD···3PIXELS

MAGENTA (M) PERIOD···2PIXELS

YELLOW (Y) PERIOD···2PIXELS

OVERLAPPING OF
M AND C

OVERLAPPING OF
M AND Y

OVERLAPPING OF
C AND Y

MAGENTA (M)
PERIOD ... 3PIXELS

CYAN (C)
PERIOD ... 2PIXELS

YELLOW (Y)
PERIOD ... 3PIXELS

OVERLAPPING OF
M AND C

OVERLAPPING OF
M AND Y

OVERLAPPING OF
C AND Y

C (CYAN)

BK (BLACK)

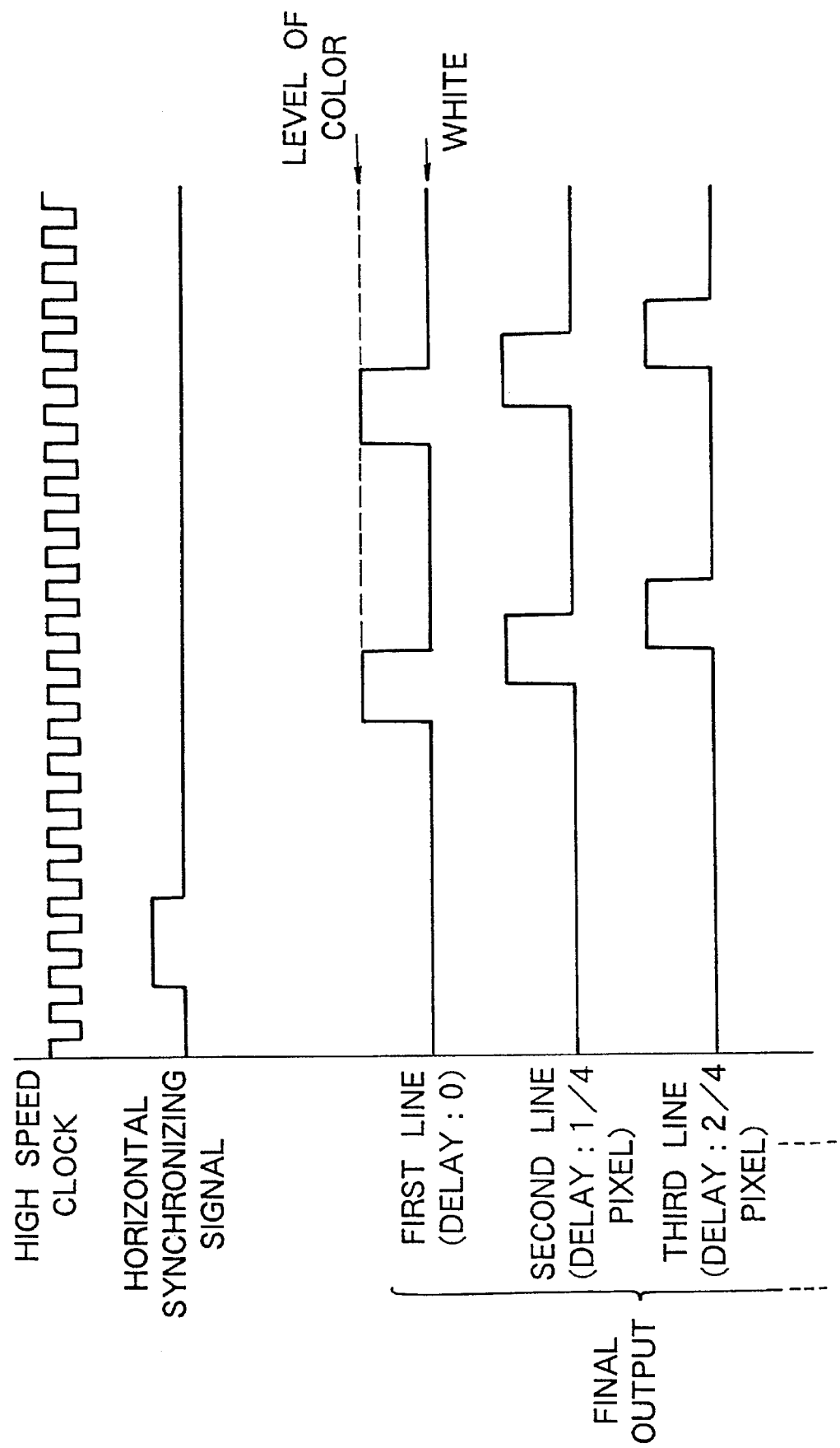

DELAY OF 0/4 PIXEL

DELAY OF 1/4 PIXEL

M (MAGENTA)

FIRST LINE
SECOND LINE
THIRD LINE

FIG. 46A

Y (YELLOW)

FIRST LINE
SECOND LINE
THIRD LINE

FIG. 46B

C (CYAN)

FIRST LINE
SECOND LINE
THIRD LINE

FIG. 46C

BK (BLACK)

FIRST LINE
SECOND LINE
THIRD LINE

FIG. 46D

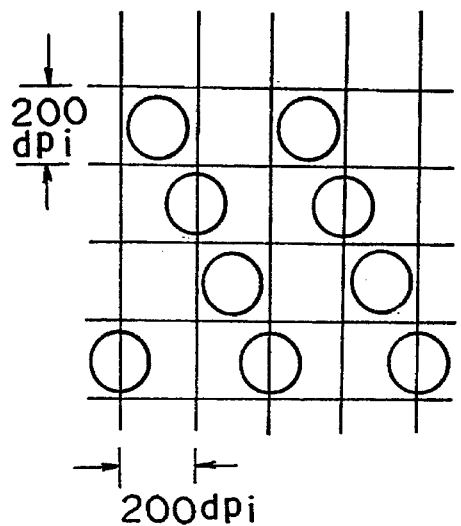
FIG. 51A (MAGENTA)
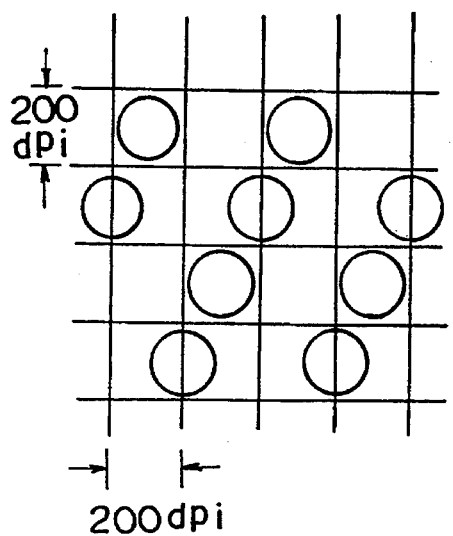
FIG. 51B (CYAN)
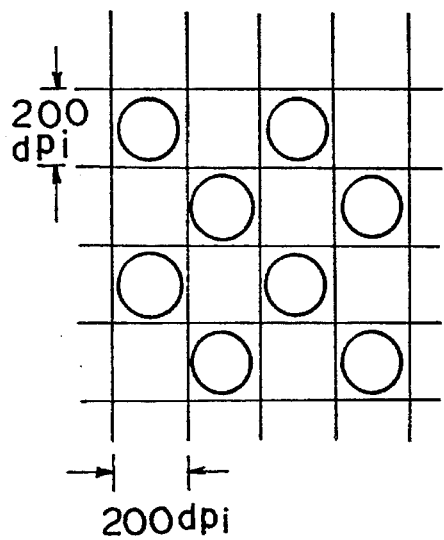
FIG. 51C (YELLOW)
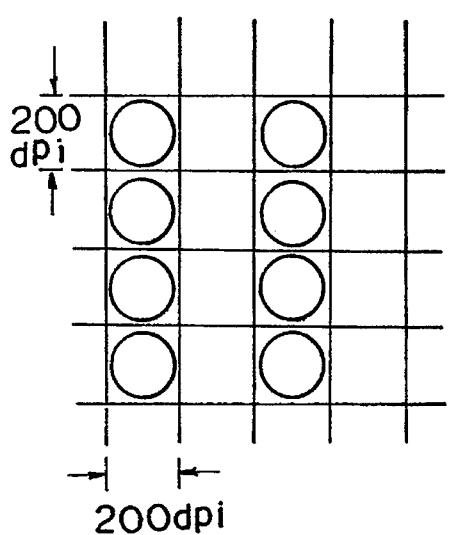
FIG. 51D (BLACK)

COLOR IMAGE PROCESSING APPARATUS WHICH USES DIFFERENT SCREEN ANGLES FOR DIFFERENT COLOR COMPONENTS

This application is a continuation of application Ser. No. 07/945,584 filed Sep. 16, 1992, now abandoned, which was a continuation of application Ser. No. 07/642,279 filed Jan. 15, 1991, now abandoned.

BACKGROUND OF THE INVENTION

1. Field of the Invention

The present invention relates to a color image processing apparatus, and, more particularly, to a color image processing apparatus for use in a printer of an electronic photography system or a thermal transfer system.

2. Description of the Related Art

FIG. 1 illustrates a conventional copying machine of a full color electronic photography system and serving as a multicolor image forming apparatus.

A photosensitive drum 1 having, on the surface thereof, a photosensitive layer for the electronic photography is rotated in a direction designated by an arrow X. A primary charger 2 is disposed to the left of the photosensitive drum 1. Furthermore, a surface potential meter 3 for measuring the surface potential of the photosensitive drum 1 is positioned off to the lower left of the photosensitive drum 1. In addition, a developing device 50 on which a plurality of developing units 51M, 51C, S1Y and 51Bk, which respectively use a two-component developer prepared by mixing toner and a carrier, are loaded is disposed below the photosensitive drum 1, the developing device 50 being capable of moving laterally. A transfer device 5 is positioned off to the upper right to the photosensitive drum 1. Furthermore, a pre-electrostatic charge remover 6 is disposed substantially above the photosensitive drum 1, the pre-electrostatic charge remover 6 acting to reduce the adhesion force between the toner left on the surface of the photosensitive drum 1 and the photosensitive drum 1 after the transfer operation has been performed so that the surface of the photosensitive drum 1 is easily cleaned. In addition, a cleaning device 7 is positioned off to the upper left to the photosensitive drum 1.

Furthermore, an optical system 10 is disposed in the upper portion of the copying machine so that the image of an original document placed on a platen 28 is projected on to the photosensitive drum 1 by an exposing portion 9 disposed between the primary charger 2 and the surface potential meter 3. The optical system 10 comprises a first scanning mirror 11 and second and third scanning mirrors 12 and 13 moving in the same direction as the direction in which the first scanning mirror 11 moves, the second and third scanning mirrors 12 and 13 moving at half speed of that of the first scanning mirror 11. The optical system 10 further comprises an imaging lens 14, a CCD 15 integrally formed with the B, G and R filters, a laser scanner unit 16 and stationary mirrors 17 and 18.

An original document illumination light source 20 of the optical system 10 is arranged to move together with the first scanning mirror 11. Therefore, the reflected light image of the original document scanned by the first to the third scanning mirrors 11 to 13 passes through the lens 14 before the color of it is separated by the CCD 15 having a BGR four-color separating filter so that it is converted into an electric signal. Then, a signal denoting information about the original document thus obtained is subjected to an information process such as the A/D conversion before it is, as a video signal, supplied to a microprocessor unit (to be called an "MPU" hereinafter), which controls the overall function of the copying machine. The MPU causes a laser unit to oscillate a laser beam via a laser driver, the laser beam being then applied/not applied to the photosensitive drum 1. As a result, the copying sequence is started.

Furthermore, a fixing device 20 and a paper feeding device 30 are disposed in the right portion of the copying machine. In addition, a copying-paper conveyance systems 25 and 35 are respectively disposed between the transfer drum 5 and the fixing devices 20 and between the same and the paper feeding device 30.

As a result of the thus arranged structure, the photosensitive drum 1 is, for each color separated by the CCD 15, subjected to charging, exposing, developing, transferring and cleaning processes by the primary charger 2, the optical system 10, the developing device 50, the transfer device 5 and the cleaning device 7.

The developing device 50 comprises developing units 51M (a Magenta developing unit), 51C (a Cyan developing unit), 51Y (a Yellow developing unit) and 51Bk (a Black developing unit) so as to cause the developing units to make the latent image for each color, which has been separated, to be a visual image.

The transfer device 5 usually comprises a transfer drum 5b having a gripper 5a for gripping, on the outer surface thereof, a transfer agent, that is, transfer paper P. The transfer device 5 grips, by its gripper 5a, the front portion of the transfer paper P supplied from a transfer paper cassette 31 or 32 of the paper feeder 30 via a transfer paper conveyance system 35. Then, the transfer paper P is attracted to the transfer drum 5b by an action of an attraction charger 4 disposed in the transfer drum 5b. Then, the transfer device 5 rotates and conveys the transfer paper P so as to cause the visual image for each color on the photosensitive drum 1 to be transferred to the transfer paper P. In the transfer zone, a transfer charger 5c is disposed in the transfer drum 5.

The transfer paper P, to which the visual images for each color, that is, the toner images have been successively transferred, is separated from the gripper 5a before it is separated from the transfer drum 5b by a separating charger 8 and a separating claw 8'. Then, the transfer paper P is sent to the fixing deice 20 by the transfer paper conveyance system 25. The toner image on the transfer paper P is fixed by the fixing device 20 at that position before the transfer paper is discharged to a tray 23.

However, according to the above-described conventional example, the diameter of the transfer drum 5b cannot be enlarged since the size of the copying machine must be reduced. Furthermore, the transfer paper conveyance system 35 and the transfer paper conveyance system 25 positioned to act after the transfer and the separation process are not disposed sufficiently farther from each other in the direction of the rotation of the transfer drum 5b. That is, the position at which the transfer paper P is attracted and the position at which the same is separated are not positioned sufficiently farther from each other with respect to the position at which the image is transferred in the direction of rotation of the transfer drum 5b. Therefore, the following problems arose:

That is, as shown in FIG. 2A, in a case where the size of the transfer paper P is relatively large such as A3 sheet, the photosensitive drum 1 is vibrated when the transfer sheet forming the side surface of the transfer drum 5b is pressed by the transfer paper P. As a result, the latent image of the first color will deviate with respect to the latent images of other colors.

A second problem arises as shown in FIG. 2B in that the transfer image of the first color will deviate from the images of other colors since the transfer sheet and the transfer paper P is not closely contact with each other.

A third problems arises as shown in FIG. 2C in that, since the latent image of the final color which is being formed is vibrated or the transfer position deviates at the time of the separation of the transfer paper P from the transfer sheet 5b, the transfer image of the final color will also deviate from the latent image of other colors.

As a result of deterioration in the image quality due to the above-described transfer position, a first color image formation pattern 71 and an image formation pattern 72 for another color will slightly deviate in the screen angle as shown in FIG. 3. This leads to a fact that the position at which the two colors overlap and the position at which they do not overlap will generate for a long period, causing a problem in terms of color moire and that in terms of irregular color to take place.

A multicolor image forming apparatus is usually structured in such a manner that an image is formed for each color component and they are multiplied so that a multicolor image is formed.

However, a problem arises in that the accuracy of each of the mechanical elements will deteriorate due to a desire of cost reduction, causing the image quality to be deteriorated. The image deteriorations are classified into deteriorations for a long period and that for a short period.

The deteriorations for a long period described above are exemplified by irregular color and color tone change due to the resist timing or the like generated in the paper feeding at the time of multiplying the images for each of the color components. The deteriorations for a short period are exemplified by deteriorations taken place due to an irregular pitch or the like caused from the deterioration in the plane accuracy of the polygon mirror.

FIG. 4 is a structural view which schematically illustrates an image forming portion of a color laser printer of the type described above.

Referring to the drawing, a photosensitive body 101 is being rotated in a direction designated by an arrow 102.

In the color laser printer shown in FIG. 4, the photosensitive body 101 is equally charged by a charger 103. Then, an image exposure process is performed by an image scanning exposure method in which the image portion is exposed to light by a semiconductor laser which has been modulated in accordance with image data 112 for each color and emitted from a signal generating means 111 and the non-image portion is not exposed. As a result, a static latent image is formed.

A latent image for the first color is developed by a developing device 105 for the first color so that a toner image is formed on the photosensitive body 101. The thus formed image is transferred to transfer paper 107 to be previously supplied to a transfer drum 113. Then, the residual toner left on the photosensitive body 101 is cleaned by a cleaner 110.

The above-described operation is performed for each of the colors so that a multicolor image is formed on the transfer drum 113. Then, the static charge of the transfer paper 107 is separated by a separating charger 108 before the multicolor image is fixed by a fixing device 109. Then, the transfer paper 107 is discharged as designed.

In order to supply an image density signal to the thus constituted laser printer and to reproduce a half tone image in response to the image density signal, a method capable of modulating the laser beam emission period in response to the image density signal has been disclosed.

FIG. 5 is a block diagram which illustrates the structure of a circuit capable of realizing the above-described method.

Digital data 121 transmitted from a digital data output device 131 is converted into an analog image signal 122 by a D/A converter 132.

On the other hand, a pattern signal 126 (for example, a triangular wave) is generated by a pattern signal generator 135. The pattern signal 126 is arranged in such a manner that its synchronizing signal is a screen clock 125 obtained by dividing (count down to a half period here) a transfer image clock 123 for image data by a reference clock signal 124 generated by an oscillator 133, the dividing operation of the transfer image clock 123 being performed in a timing signal generating circuit 134.

The analog image signal 122 and the pattern signal 126 are subjected to a comparison by a comparator 136. Then, binary image data 127 is processed in such a manner that data "0" is processed if it has been determined that the analog image signal is larger than the pattern signal 126 and data "1" is processed if it has been determined that the same is smaller than the pattern signal 126.

According to the thus arranged image processing method, the digital image signal is converted into the analog signal before it is subjected to a comparison with a triangular wave of a predetermined period. As a result, substantially successive pulse width modulation is performed so that a high quality image output exhibiting an excellent gradation can be obtained.

Furthermore, the circuit in which the above-described pulse width modulation is performed is arranged to comprise a shift register 137 between the timing signal generating circuit 134 and the pattern signal generator 135 so that the phase of the pattern signal 126 is delayed for each of the scanning lines. As a result, an output of a halftone dot image having an image formation angle can be obtained.

FIGS. 6A and 6B illustrate the waveform of examples of delaying the pattern signal for each of the scanning lines performed by the delay circuit. FIGS. 7A and 7B are schematic views which illustrate the patterns of the output image of each color, the patterns being realized in response to the pattern signal.

In the above-described structure, the recording density was arranged to be 80 dpi (5 pixels correspond to 1 dot) in the main scanning direction and 400 dpi (1 pixel corresponds to 1 dot) in the sub-scanning direction. The quantity of the delay of the pattern signal was arranged to be ⅖ dot for the first color and ⅗ dot for the second color. In addition, the image formation angle was arranged to be 26.6° and −26.6°, respectively.

As a result of the structure in which the different image formation angles are provided for every color, an output image without irregular color and color tone change can be obtained from a color laser printer using the printing technology even if the above-described deviations have taken place.

The reason why the irregular color and the color tone change can be prevented will be now be described.

When the pattern for each of the colors shown in FIGS. 7A and 7B is multiplied, the pixels overlapped and the pixels which are not overlapped periodically appear as shown in FIG. 8A if there is not deviation. Then, an assumption is made that the image for the first color is deviated to the right by a degree corresponding to one pixel when viewed in FIG. 8B from the position at which the same must be multiplied.

As a result of a comparison between FIGS. 8A and 8B, the patterns in which the overlapped pixels and non-overlapped pixels appear are the same although the positions of the appearance are deviated. Furthermore, it can be understood that the number of the non-overlap pixels, which must be overlapped and the number of the overlapped pixels, which must not be overlapped, due to the deviation are the same.

As a result, an image without the irregular color and color tone change can be formed.

In a color laser printer of the type described above and which uses a polygonal mirror as the scanner device thereof, the short period image deterioration can be generated due to the irregular pitch or the like as described above. Therefore, in a case where an octahedral polygonal mirror displaying insufficient accuracy is used, a problem arises, as shown in FIG. 9, in that undesirable diagonal lines are generated in the highlight portions and halftone portions since the writing position is periodically deviated in each of the main scanning direction and the sub-scanning direction for each of the scanning lines.

The reason for this lies in that, when the scanning beam is applied to the position deviated from the desired position, the positions of the dots, which are disposed at substantially the same intervals as those of the surrounding pixels, are deviated as shown in FIG. 11 since the scanning beams for forming the dots display the light quantity distributions as shown in FIGS. 10A and 10B. As a result, irregular interference takes place between dots as shown in FIG. 12. Therefore, the problem of this type becomes more critical in proportion to the improvement in the resolution.

Furthermore, when a slight deviation takes place such that the multiplying position shown in FIG. 13A is deviated by a degree corresponding to the half pixel as shown in FIG. 13B, the overlapping area becomes different depending upon the shape of the pixel which forms one pixel. Therefore, another problem arises in that the irregular color and color tone change take place in the highlight portions and halftone portions.

The above-described problems have commonly been taken place not only in the conventional printer arranged to act in accordance with the pulse modulation method but also in all of color laser printers which utilize the halftone dot printing technology including the printers arranged to employ the threshold matrix.

While, a color image forming apparatus has been disclosed which is capable of modulating the pulse width of each of color component signals by making a comparison with a pattern signal such as a triangular signal for each of the color component signals which constitute the color image signal.

As disclosed in Japanese Patent Laid-Open No. 62-198266, an apparatus of the type described above employs a method of removing color moire (the deteriorations for a long period) by the pulse width modulation performed in such a manner that a reference signal of a different phase and an image signal are subjected to a comparison for each of colors.

Furthermore, Japanese Patent Laid-Open No. 62-183670, Japanese Patent Laid-Open No. 62-183676 and Japanese Patent Laid-Open No. 62-183680 have disclosed methods of removing the moire by varying the quantity of delaying the reference signal for each of the lines.

However, by the above-described methods, the deteriorations for a short period can not be removed, and what is worse, the deteriorations for a long period can not be entirely removed.

What is even worse, the problems of the types described above become critical in proportion to the deterioration in the rotational accuracy of the polygonal mirror and the degree of the deviation in the resistance. Therefore, the accuracy must be improved and a complicated control must be performed in order to prevent the image deterioration due to the above-described problems. As a result, the overall cost of the apparatus will rise excessively.

The above-described problems are not limited to the color laser beam printer and are common to all of the multicolor image forming apparatus such as an ink jet printer and a thermal transfer printer if it modulates and transmits a multicolor image input signal. Also a dichroic printer of a Black and red colors type or a multicolor printer exceeding two colors encounter the similar problems.

Although a plurality of methods have been disclosed so as to overcome the above-described problems, they encounter other problems in terms of novel image deterioration such as an irregular pitch. Therefore, a practical method has not been realized as yet.

SUMMARY OF THE INVENTION

An object of the present invention is to overcome the above-described problems.

Another object of the present invention is to improve the above-described color image processing apparatus.

Another object of the present invention is to provide a color image processing apparatus which can be widely used.

Another object of the present invention is to provide a color image processing apparatus capable of preventing a deterioration in the image quality if the position at which images of each of the colors are deviated in an output apparatus such as a printer.

Another object of the present invention is to provide a color image processing apparatus capable of setting the screen angle for the color which is first or finally formed to be different from the screen angle for another color when images of a plurality of colors are successively formed for each of colors in an output apparatus such as a printer.

Another object of the present invention is to provide a color image processing apparatus capable of preventing the deterioration in the image quality such as the color deviation, the irregular pitch and the irregular line shape problem when an image is formed by an output apparatus such as a printer.

Another object of the present invention is to provide a color image processing apparatus capable of changing the quantity of delay of a reference signal for each of lines and varying the quantity of delay for each of colors.

Another object of the present invention is to provide a color image processing apparatus for forming a pixel by a plurality of different color components, the image processing apparatus comprising: input means for successively inputting image data which corresponds to the color components in units of pixels of a predetermined quantity; delay means for delaying, with respect to the reference phase, at least either the first color component or the last color component of the image data supplied by the input means; and output means for successively transmitting the image data supplied by the input means in accordance with delay realized by the delay means in units of pixels of a predetermined quantity.

Another object of the present invention is to provide a color image processing apparatus for forming one pixel by a plurality of different color components, the image processing apparatus comprising: setting means for previously setting the recording density in the main scanning direction to be smaller than that in the sub-scanning direction; input means for successively inputting image data which corresponds to the color components in units of pixels of a predetermined quantity; phase control means for controlling the image data supplied by the input means into different phases for each color component in accordance with the recording density set by the setting means; and output means for successively transmitting the image data supplied by the input means in units of pixels of a predetermined quantity.

Another object of the present invention is to provide a color image processing apparatus for forming one pixel by a plurality of different color components, the image processing apparatus comprising: generation means for generating a plurality of reference signals having different periods; input means for successively inputting image data which corresponds to color components in units of pixels of a predetermined quantity; selection means for selecting the reference signals which corresponds to the color components of the image data supplied by the input means from the plurality of reference signals generated by the generation means; phase control means for controlling the phase of the units of pixels of a predetermined quantity for each color component in response to each of the selection signals selected by the selection means; modulation means for modulating the image data supplied by the input means for each of the color components in accordance with control performed by the phase control means; and output means for successively transmitting the image data modulated by the modulation means in the units of pixels of a predetermined quantity.

Another object of the present invention is to provide a color image processing apparatus for forming one pixel by a plurality of different color components, the image processing apparatus comprising: input means for successively inputting image data which corresponds to each color component in units of pixels of a predetermined quantity; modulation means for modulating the pulse width of the image data supplied by the input means in accordance with color components; delay means for delaying the image data which has been subjected to the pulse width modulation by the modulation means in accordance with the color components; and output means for successively transmitting the image data delayed by the delay means in the units of pixels of a predetermined quantity.

Another object of the present invention is to provide a color image processing apparatus for successively forming images for each of a plurality of color components, said image processing apparatus comprising: input means for successively inputting image data which corresponds to each of said color components; and image forming means for successively forming an image in accordance with said image data which corresponds to each of said color components and which has been inputted by said input means; wherein said image forming means makes at least either the screen angle at the time of the image forming operation in accordance with the image data for a color component which has been inputted first or the screen angle at the time of the image forming operation in accordance with the image data for a color component which has finally been inputted to be different from the screen angle at the time of the image forming operation in accordance with image data of another color component.

Another object of the present invention is to provide an image processing apparatus comprising: input means for inputting image data; binary data generating means for generating binary data in accordance with said image data inputted by said input means and each of thresholds which constitute a predetermined threshold matrix; and image forming means for forming an image in accordance with said binary data; wherein said threshold of said threshold matrix is determined so as to make said image formed in accordance with said binary data to be constituted by dots arranged to form an elongated shape elongating in a predetermined direction.

Another object of the present invention is to provide a color image processing apparatus for forming a color image by overlapping a plurality of color images each of which is constituted by a multiplicity of dots, said color image processing apparatus comprising: input means for inputting image data; and image forming means for forming an image in accordance with said image data inputted by said input means, said image forming means setting the period and the phase of a dot on a line for each of the color images in accordance with the color and the number of the lines, wherein said image forming means sets the period and the phase of the dots on said line so as to make a plurality of adjacent dots of dots the positions of which are overlapped for at least two colors to be positioned at the verteces of a substantially regular polygon when color images are overlapped.

Another object of the present invention is to provide a color image processing apparatus comprising: input means for inputting image data which corresponds to color components; and image forming means for forming an image at different screen angles for each of colors in accordance with image data for each of color components inputted by said input means; wherein said image forming means forms an image at different screen angles for each of colors by shifting the line directional position of dots to be recorded by predetermined quantities of shifting for each of color components for each of lines, said predetermined quantities of shifting being set in units smaller than one pixel. Another object of the present invention is to provide an image processing apparatus comprising: input means for inputting image data deduced in a raster successive manner; a pattern signal generator for generating a predetermined pattern signal; a PWM signal generator for generating a PWM signal in accordance with image data inputted by said input means and said predetermined pattern signal; a delay circuit capable of delaying said PWM signal generated by said PWM signal generator by different quantities of delay for each of lines; and an image forming unit for forming an image in response to said PWM signal transmitted by said delay circuit.

Another object of the present invention is to provide a color image processing apparatus comprising: input means for inputting image data; and image forming means for forming an image constituted by a multiplicity of dots in accordance with image data inputted by said input means; wherein said image forming means is capable of moving the position at which monochromatic dots arranged on a line are formed in the direction of said line in units of a quantity of change which is smaller than one pixel in accordance with the color of said dots and the position of said line.

Other and further objects, features and advantages of the invention will be appear more fully from the following description.

BRIEF DESCRIPTION OF THE DRAWINGS

FIGS. 6A and 6B are waveform drawings which illustrate examples of the generation of the delay of a pattern signal;

FIGS. 14A to 14D illustrate image formation patterns for each color according to a first embodiment of the present invention;

FIG. 16 illustrates an image forming pattern according to a first embodiment of the present invention;

FIGS. 17A to 17C illustrate examples of the image forming pattern for M, C and Y according to a modification to the first embodiment of the present invention;

FIGS. 18A, 18B, 19A and 19B illustrate examples of the image forming pattern of a dichroic image;

FIGS. 25A and 25B illustrate examples of the pattern signal for the first and second colors according to the second embodiment of the present invention;

FIGS. 27A and 27B illustrate examples of the output patterns of the recording density of which are different according to the second embodiment of the present invention;

FIGS. 28A to 28C illustrate examples of threshold matrices according to the first to third colors according to the second embodiment of the present invention;

FIG. 43 is a timing chart which illustrates an example of the final output according to the fourth embodiment of the present invention;

FIGS. 46A to 46D illustrate output patterns after the pulse width modulations performed to correspond to each color according to a fifth embodiment of the present invention;

FIGS. 51A to 51D illustrate examples of forming substantially elongated full color image.

DESCRIPTION OF THE PREFERRED EMBODIMENTS

First Embodiment

FIGS. 14A to 14D illustrate image forming patterns for the corresponding colors formed by a full color copying agent according to a first embodiment of the present invention. According to this embodiment, a desired full color image is formed by overlapping images of the corresponding colors by using toner for four colors in order to form a four color full color image. As shown in FIGS. 14A to 14D, the screen angle of 45° in the image forming pattern for Magenta (M) which is the first color and the screen angle of 26.6° for Black (Bk) which is the final color are respectively arranged to be different from the screen angle of 0° for Cyan (C) which is the second color and that for Yellow (Y) which is the third color.

Figure 1:
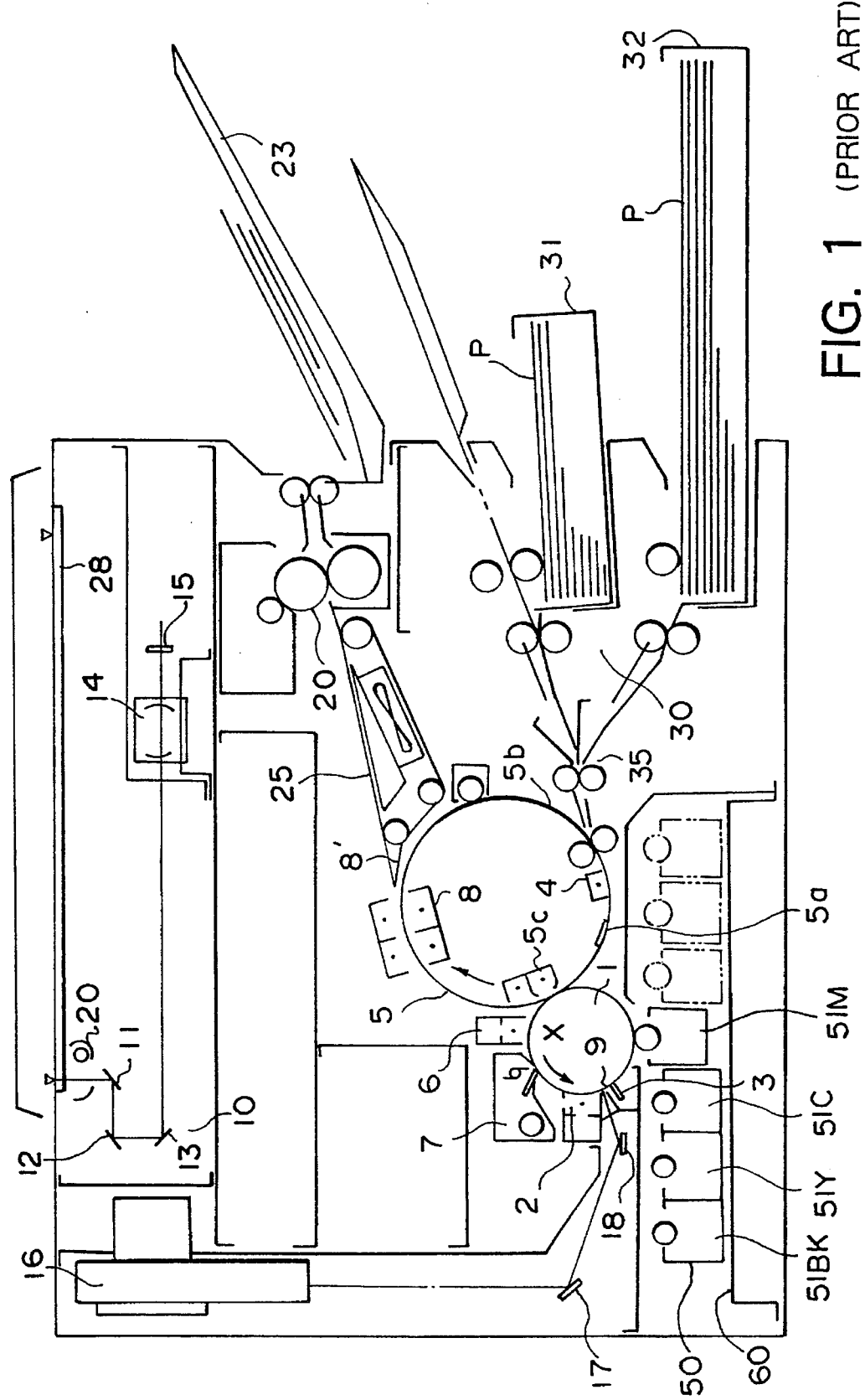
FIG. 1 schematically illustrates a conventional copying machine of a full color electronic photography system.
Figure 2A:
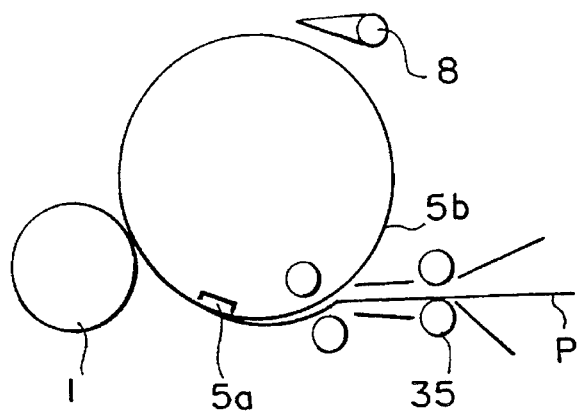
FIGS. 2A to 2C illustrate problems experienced in the conventional structure.
Figure 3:
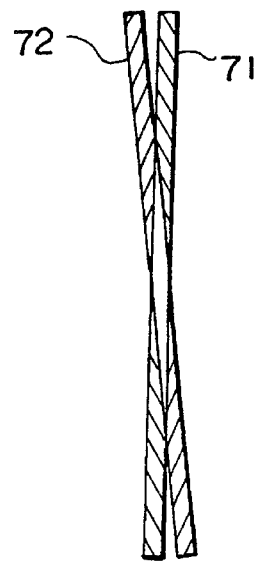
FIG. 3 illustrates an irregular color state experienced in the conventional structure.
Figure 2B:
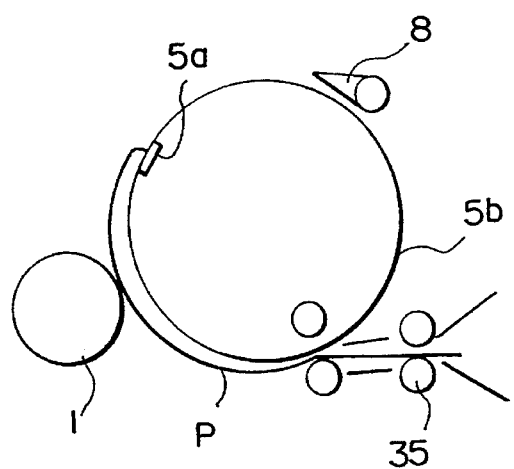
Figure 2C:
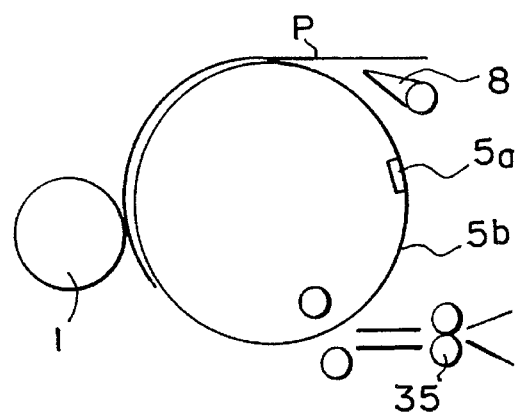

Since the overall structure of a full color copying machine for forming the image forming pattern is the same as that of the conventional structure (see FIG. 1), the description about it is omitted here and only the structure for processing the above-described image forming pattern is described.

Figure 15:
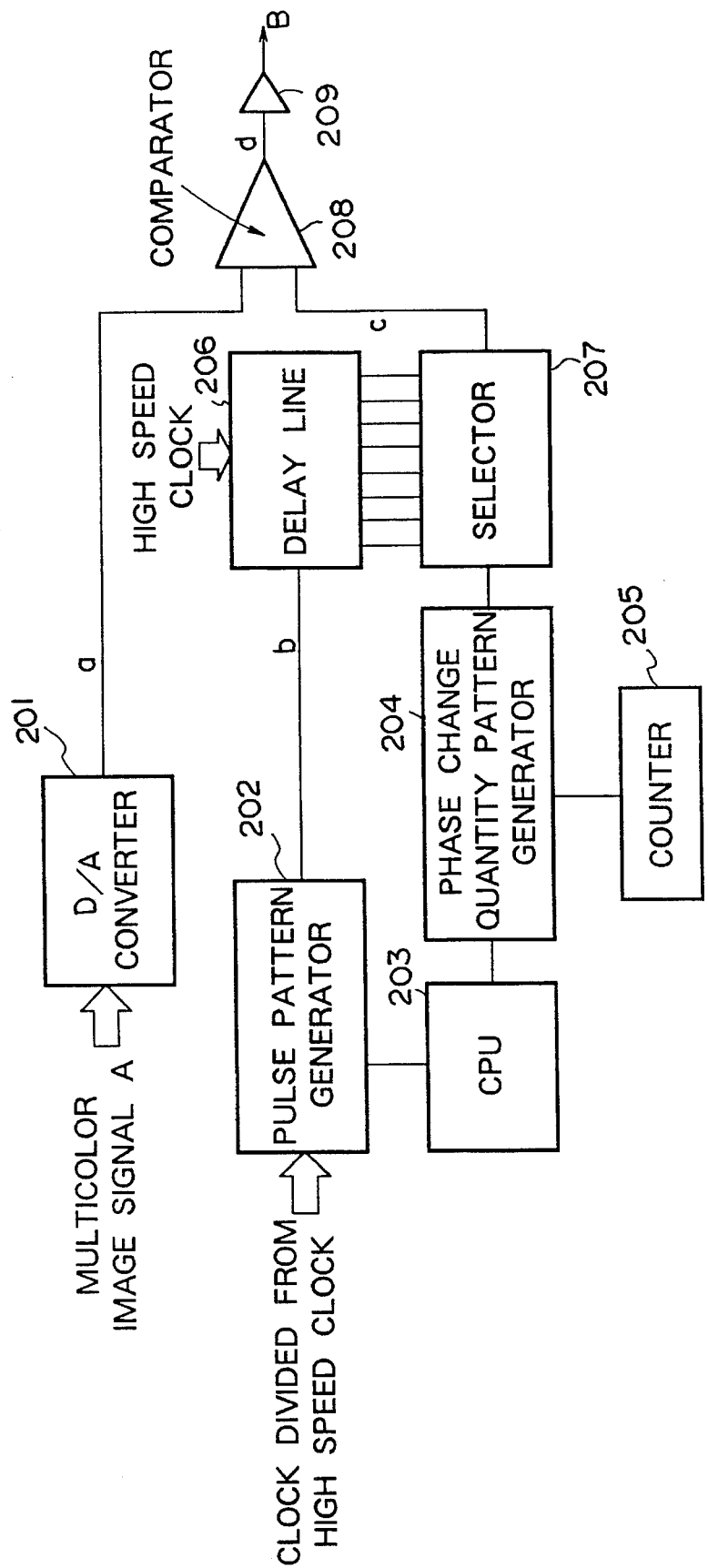
FIG. 15 is a block diagram which illustrates the structure of an image forming pattern generating device according to a first embodiment of the present invention.

FIG. 15 is a block diagram which illustrates the structure of an image forming pattern generating device according to a first embodiment of the present invention.

A multicolor image signal A (four types of digital signals for M, C, Y and Bk according to this embodiment) is converted into an analog signal a by a D/A converter 201 for each color component. On the other hand, a reference signal b (according to this embodiment, it is a triangular wave) determined for each color component is processed under a control of a CPU 203 by utilizing a clock divided from a high speed clock by a pulse pattern generator 202. The reference signal b is supplied to a delay line 206 so that it is delayed. According to this embodiment, eight types of delay patterns are provided and a selector 207 selects any one of the eight types. As shown in FIGS. 14A to 14D, the eight delay patterns are prepared which is arranged in such a manner that a delay of a quarter of one pixel is one unit of the quantity of delay. According to this embodiment, one unit of the reference unit of the pulse width modulation (PWM) is arranged to be two pixels. Furthermore, the eight types of the delay patterns are the patterns in response to PWM signals (omitted from illustration) each of which is delayed by 0/4 to 7/4 pixel.

Each of the signals denoting Y, M, C and Bk is arranged to correspond to any one of the above-described 8 types of delay patterns. The selector 207 selects any one of the delay patterns for lines of Y, M, C and Bk. The selector 207 reads delay pattern information for each line by using a phase change quantity pattern generator 204. According to this embodiment, the pattern generator 204 comprises a RAM which stores delay pattern information to be selected for each line for each color. A counter 205 counts a horizontal synchronizing signal in such a manner that counting from 1 to 8 is repeated for each line. The selector 207 successively selects the delay pattern in accordance with the delay pattern written in the pattern generator 204 whenever the counter 205 performs the counting operation so as to output it as a reference signal C. As shown in FIGS. 14A to 14D, the unit of the triangular wave is arranged in such a manner that one unit (dot) is composed of two pixels (that is, the period of the triangular wave corresponds to the two pixels). Furthermore, the quantity of the delay is arranged in such a manner that one unit is composed of a quarter pixel. The analog signal a is subjected to a comparison with the reference signal c by a comparator 208 so that it is made to be a PWM signal d before it is amplified by an amplifier 209. As a result, a processed signal B thus formed is transmitted.

The above-described operation is performed for each of the color components so that the component M is not delayed for the odd number lines but is delayed by 4/4 pixel for the even number lines so that the image is formed at a screen angle of 45° (see FIG. 14A). The components C and Y are not delayed for all of the lines, that is, image forming is performed at a screen angle of 0° (see FIGS. 14B and 14C). The component Bk is not delayed for the i+i the line (i=0, 1, 2, . . . ) and delayed by 2/4 pixel for the i+2 th line, delayed by 4/4 pixel for the i+3th line and delayed by 6/4 pixel for the i+4th line so that the image is formed at a screen angle of 26.6° (see FIG. 14D). Thus, outputs corresponding to all of the colors are obtained in the full color copying machine as a multiplied image.

Figures 16, 18A, 18B:
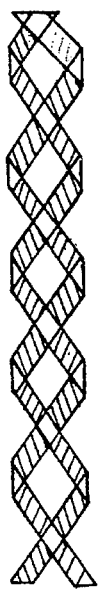

As described above, the screen angle at the image forming for the first and the fourth colors and that for the second and the third colors are different from each other. As a result, irregular color can be prevented as shown in FIG. 16.

Modification

The present invention is not limited to a full color image formed by four colors but is preferably employed in any of the structures which outputs a multicolor image formed by two colors or more.

Figures 19A, 19B:
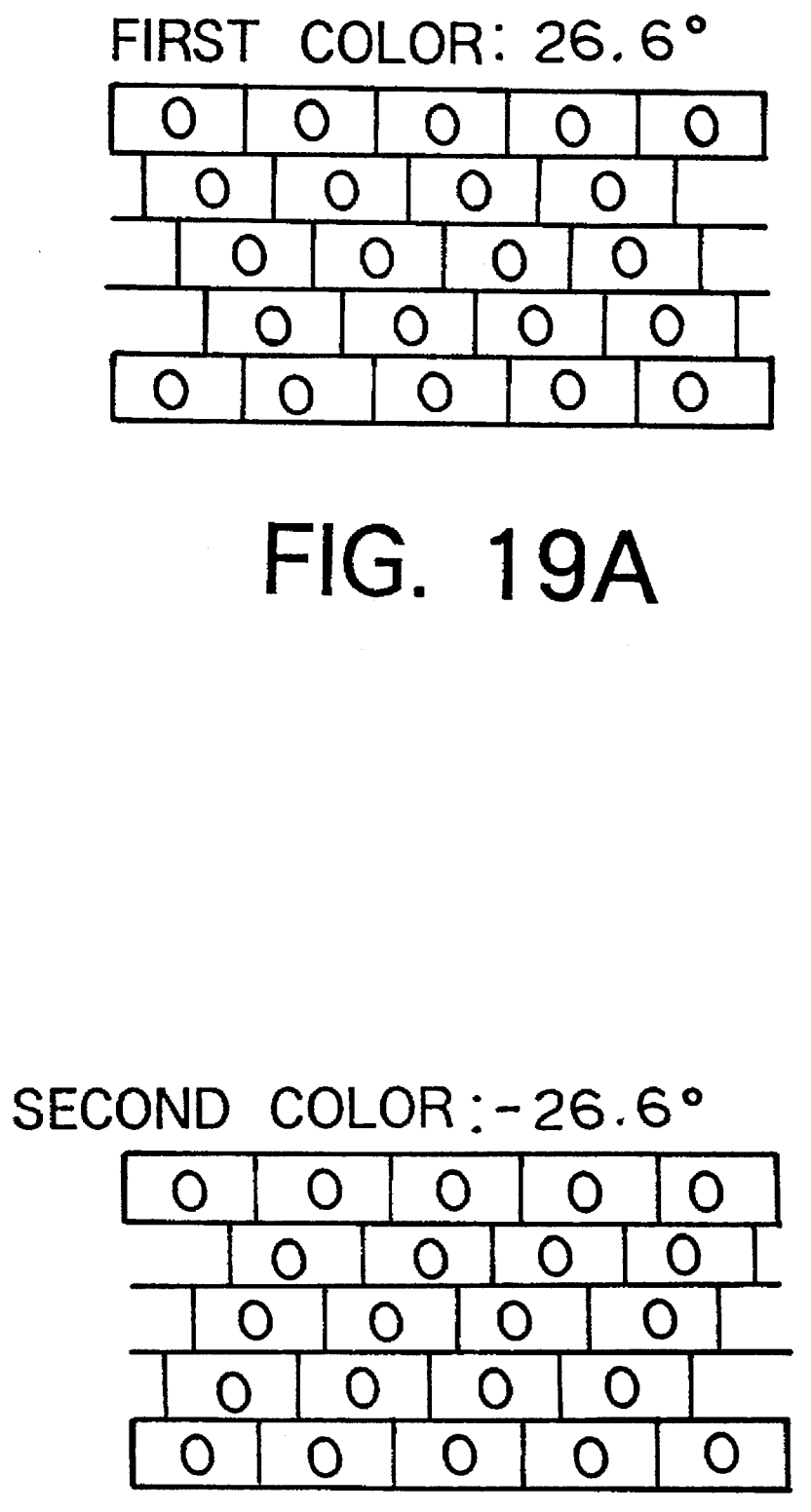

FIGS. 17A to 17C illustrate examples of image forming patterns at the time of forming the full color image formed by three colors M, C and Y. FIGS. 18 and 19 illustrate examples of image forming patterns of dichroic multiplied image formed by, for example, M+C (B), C+Y (G) or Y+M (R).

The above-described images can be transmitted from the structure of the image forming apparatus according to the first embodiment.

The present invention is not limited to the electronic photography system according to the above-described embodiments. It can be preferably employed in any of apparatus capable of forming a multi-image formed by two or more colors such as a thermal transfer printer, an LED (Light Emitting Diode) printer and an ink jet printer.

As described above, when images for a plurality of colors are successively formed for each of colors, the screen angle of the color the image of which is formed first or last is arranged to be different from that of other colors. Therefore, color deviations and irregular color in the first and the final color and color tone change at each printing can be prevented in the multicolor image forming apparatus. As a result, the image quality can always be stabilized.

Second Embodiment

Figure 4:
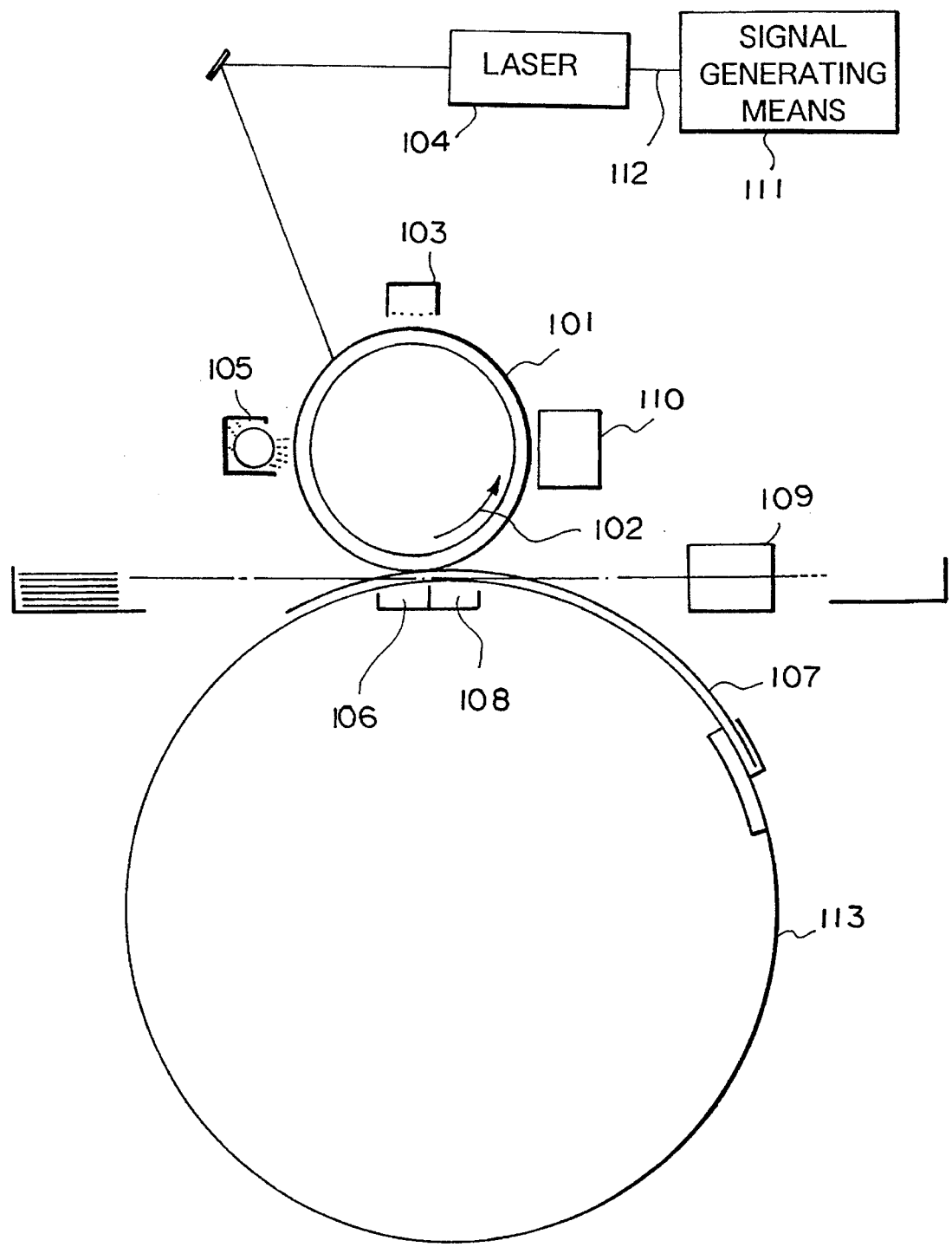
FIG. 4 schematically illustrates an image forming portion of a conventional color laser printer.

FIG. 4 is a structural view which schematically illustrates an image forming portion of a color laser printer according to the second embodiment of the present invention.

Referring to the drawing, a photosensitive body 101 is being rotated in a direction designated by an arrow A.

In the color laser printer shown in FIG. 4, the photosensitive body 101 is equally charged by a charger 103. Then, an image exposure process is performed by an image scanning exposure method in which the image portion is exposed to light by a semiconductor laser which has been modulated in accordance with image data 112 for each color and emitted from a signal generating means 111 and the non-image portion is not exposed. As a result, a static latent image is formed.

A latent image for the first color is developed by a developing device 105 for the first color so that a toner image is formed on the photosensitive body 101. The thus formed image is transferred to transfer paper 107 to be previously supplied to a transfer drum 113. Then, the residual toner left on the photosensitive body 101 is cleaned by a cleaner 110.

The above-described operation is performed for each of the colors so that a multicolor image is formed on the transfer drum 113. Then, the static charge of the transfer paper 107 is separated by a separating charger 108 before the multicolor image is fixed by a fixing device 109. Then, the transfer paper 107 is discharged as designed.

In order to supply an image density signal to the thus constituted laser printer and to reproduce a half tone image in response to the image density signal, a method capable of modulating the laser beam emission period in response to the image density signal has been disclosed.

Figure 5:
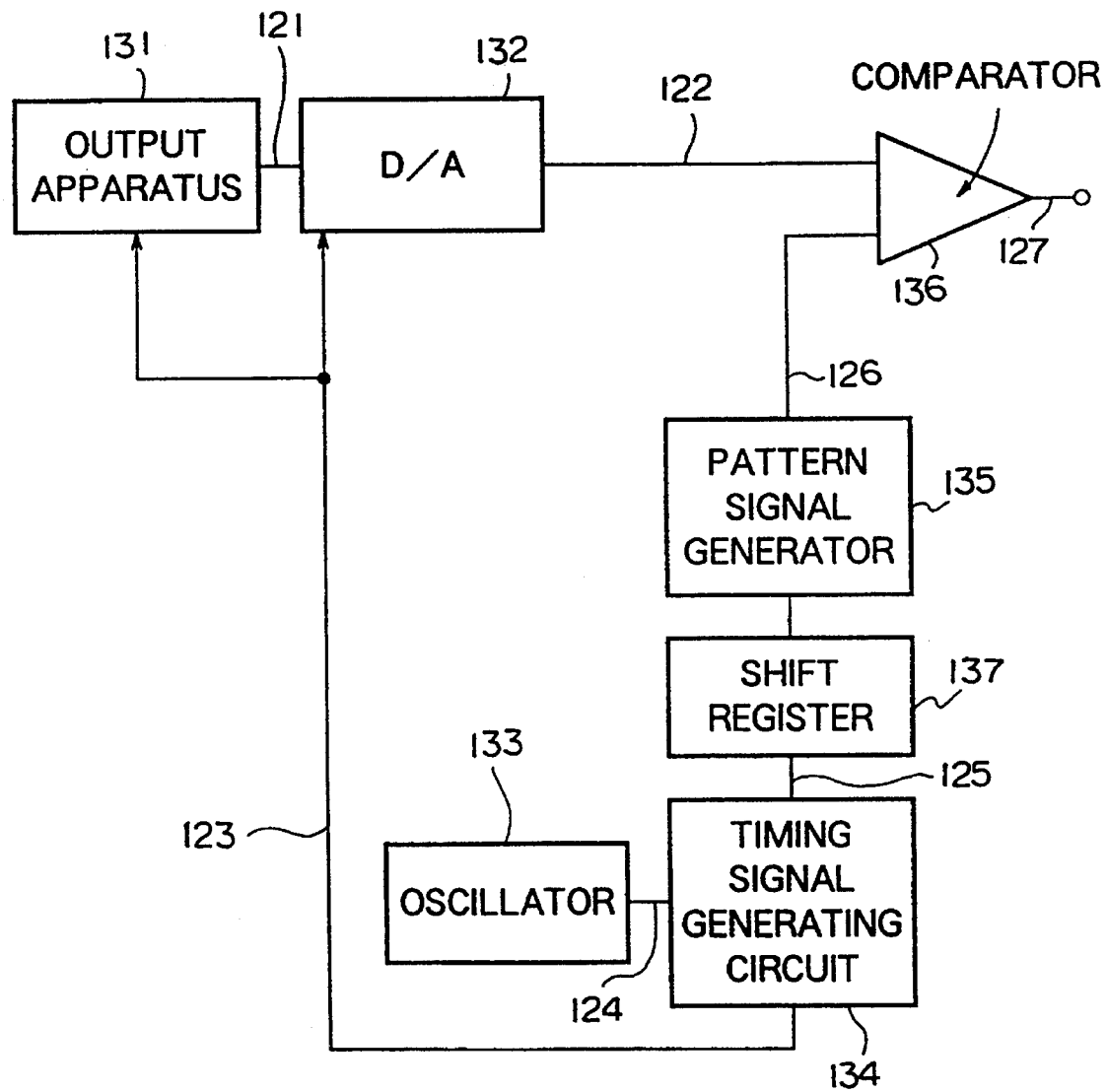
FIG. 5 is a block diagram which illustrates the structure of a circuit for modulating the laser emission time.

FIG. 5 is a block diagram which illustrates the structure of a circuit capable of realizing the above-described method.

Digital data 121 transmitted from a digital data output device 131 is converted into an analog image signal 122 by a D/A converter 132.

On the other hand, a pattern signal 126 (for example, a triangular wave) is generated by a pattern signal generator 135. The pattern signal 126 is arranged in such a manner that its synchronizing signal is a screen clock 125 obtained by dividing (count down to a half period here) a transfer image clock 123 for image data by a reference clock signal 124 generated by an oscillator 133, the dividing operation of the transfer image clock 123 being performed in a timing signal generating circuit 134.

The analog image signal 122 and the pattern signal 126 are subjected to a comparison by a comparator 136. Then, binary image data 127 is processed in such a manner that data "0" is processed if it has been determined that the analog image signal is larger than the pattern signal 126 and data "1" is processed if it has been determined that the same is smaller than the pattern signal 126.

According to the thus arranged image processing method, the digital image signal is converted into the analog signal before it is subjected to a comparison with a triangular wave of a predetermined period. As a result, substantially successive pulse width modulation is performed so that a high quality image output exhibiting an excellent gradation can be obtained.

Furthermore, the circuit in which the above-described pulse width modulation is performed is arranged to comprise a shift register 137 between the timing signal generating circuit 134 and the pattern signal generator 135 so that the phase of the pattern signal 126 is delayed for each of the scanning lines. As a result, an output of a halftone dot image having an image formation angle can be obtained.

Figure 7A:
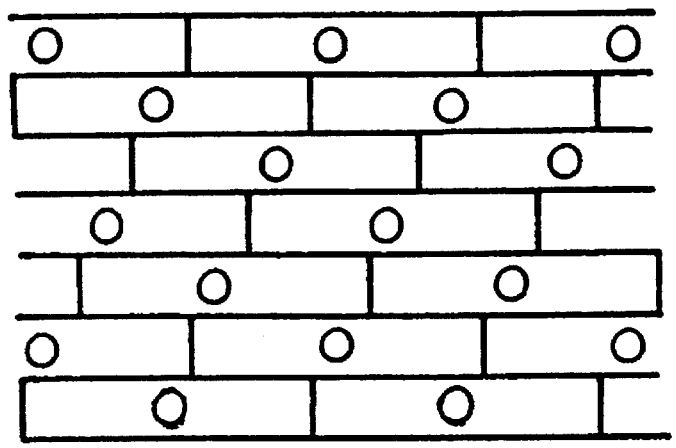
FIGS. 7A and 7B are schematic views which illustrate output image pattern for each color in response to the pattern signal.
Figure 7B:
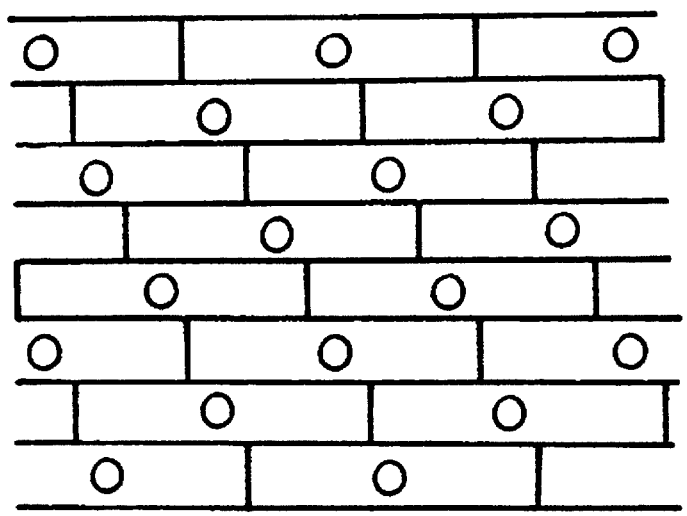

FIGS. 6A and 6B illustrate the waveform of examples of delaying the pattern signal for each of the scanning lines performed by the delay circuit. FIGS. 7A and 7B are schematic views which illustrate the patterns of the output image of each color, the patterns being realized in response to the pattern signal.

In the above-described structure, the recording density was arranged to be 80 dpi (5 pixels correspond to 1 dot) in the main scanning direction and 400 dpi (1 pixel corresponds to 1 dot) in the sub-scanning direction. The quantity of the delay of the pattern signal was arranged to be ⅖ dot for the first color and ⅗ dot for the second color. In addition, the image formation angle was arranged to be 26.6° and −26.6°, respectively.

As a result of the structure in which the different image formation angles are provided for every color, an output image without irregular color and color tone change can be obtained from a color laser printer using the printing technology even if the above-described deviations have taken place.

The reason why the irregular color and the color tone change can be prevented will be now be described.

Figure 8A:
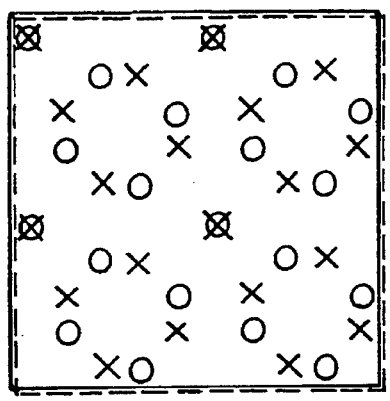
FIGS. 8A and 8B illustrate the color deviation takes place at the time of printing.

When the pattern for each of the colors shown in FIGS. 7A and 7B is multiplied, the pixels overlapped and the pixels which are not overlapped periodically appear as shown in FIG. 8A if there is not deviation. Then, an assumption is made that the image for the first color is deviated to the right by a degree corresponding to one pixel when viewed in FIG. 8B from the position at which the same must be multiplied.

Figure 8B:
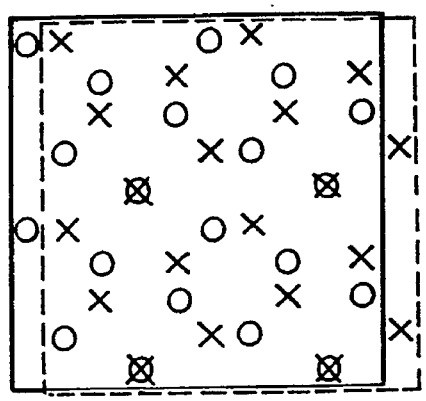
Figure 9:
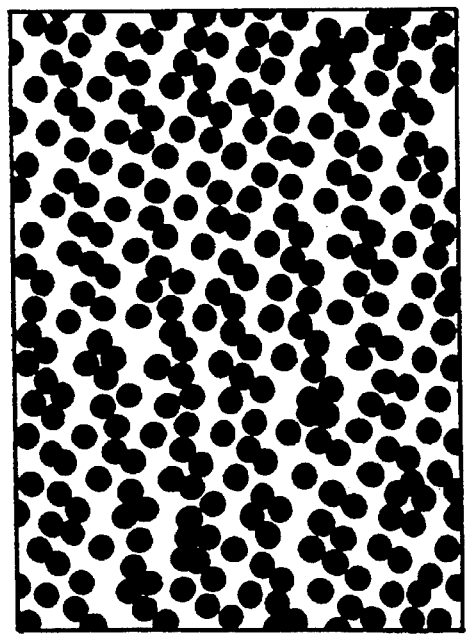
FIG. 9 illustrates an example of generation of lines in a highlight portion and a halftone portion according to the conventional structure.
Figure 10A:
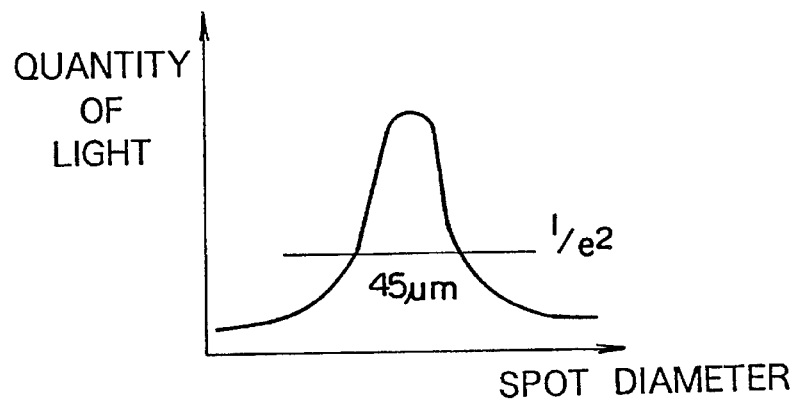
FIGS. 10A and 10B illustrate ordinary light quantity distributions.
Figure 10B:
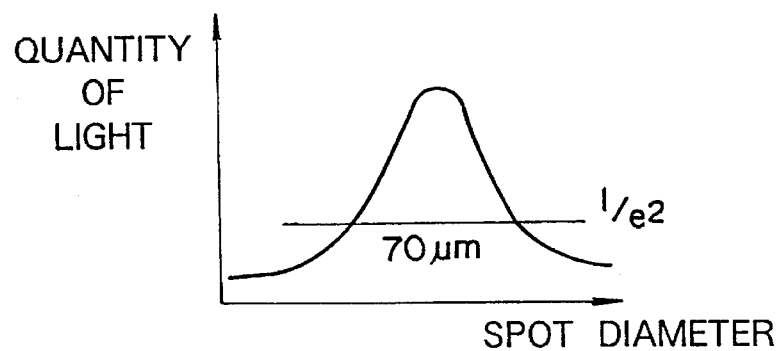

As a result of a comparison between FIGS. 8A and 8B, the patterns in which the overlapped pixels and non-overlapped pixels appear are the same although the positions of the appearance are deviated. Furthermore, it can be understood that the number of the non-overlap pixels, which must be overlapped and the number of the overlapped pixels, which must not be overlapped, due to the deviation are the same.

As a result, an image without the irregular color and color tone change can be formed.

Figure 20:
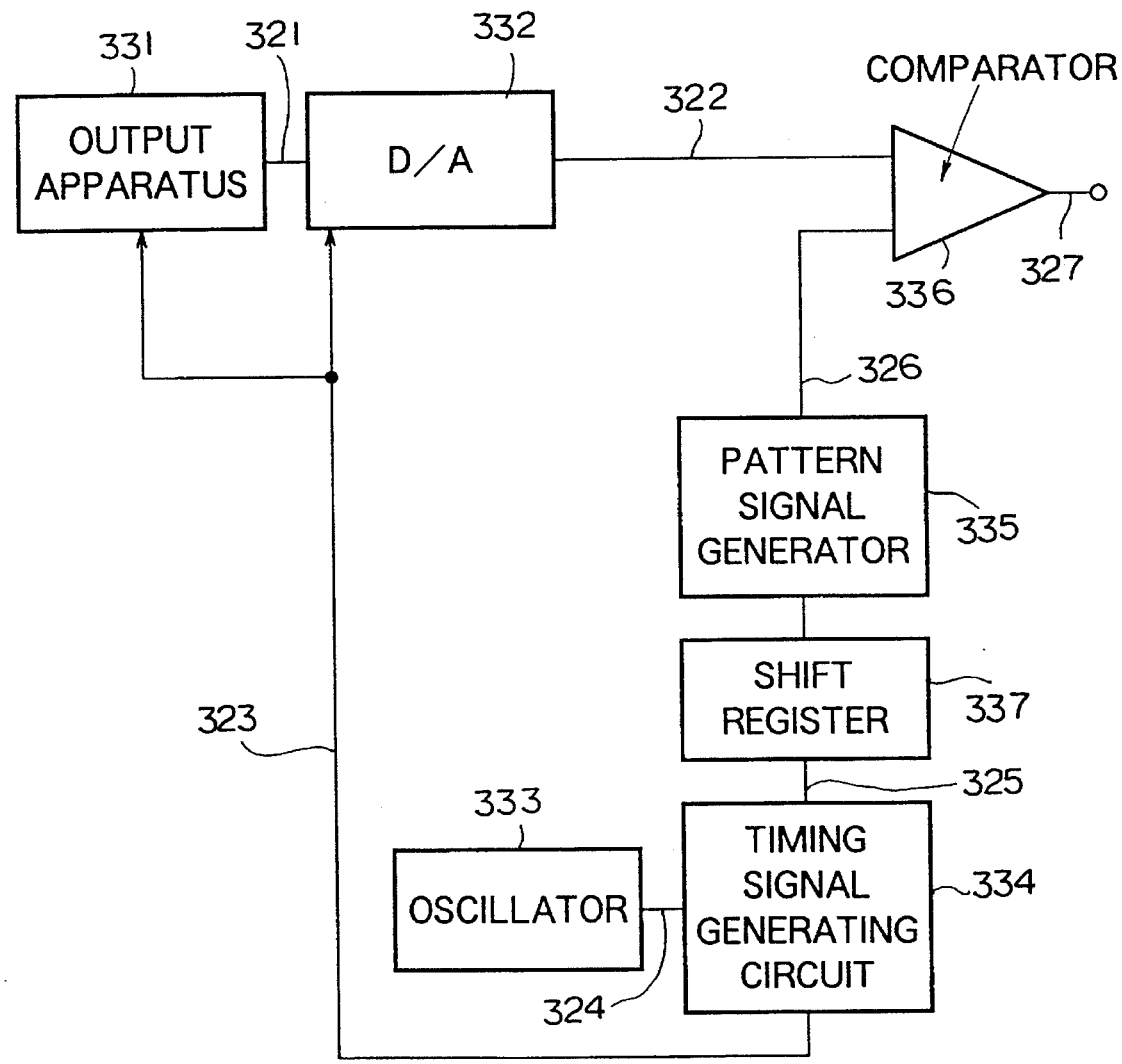
FIG. 20 is a block diagram which illustrates the structure of a pulse width modulation circuit of a color laser printer according to a second embodiment of the present invention.

FIG. 20 is a block diagram which illustrates a pulse width modulation circuit for a color laser printer according to a second embodiment of the present invention.

The basic structure according to this embodiment is arranged to be the same as that according to the conventional structure shown in FIG. 5. However, according to this embodiment, the resolution realized by a pattern signal generator 335 and the quantity of delay realized by a shift register 337 are properly determined so that substantially-elongated pixels having different image forming angles for each of the color components are formed. The other elements except for the pattern signal generator 335 and the shift register 337, that is, the output device 331, the D/A converter 332, the comparator 336, the oscillator 333 and the timing signal generating circuit 334 are the same as those of the structure shown in FIG. 5. Therefore, their descriptions are omitted here.

Figure 21A:
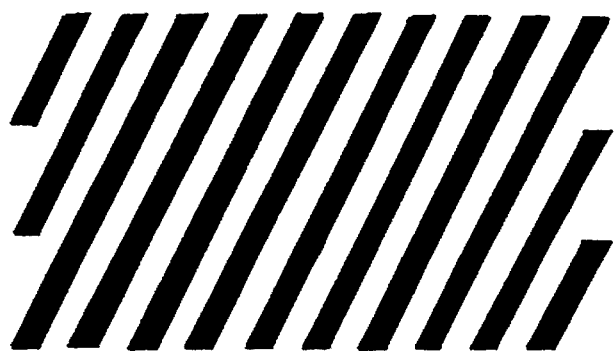
FIGS. 21A and 21B illustrate examples of the output of a halftone image according to the second embodiment of the present invention.
Figure 21B:
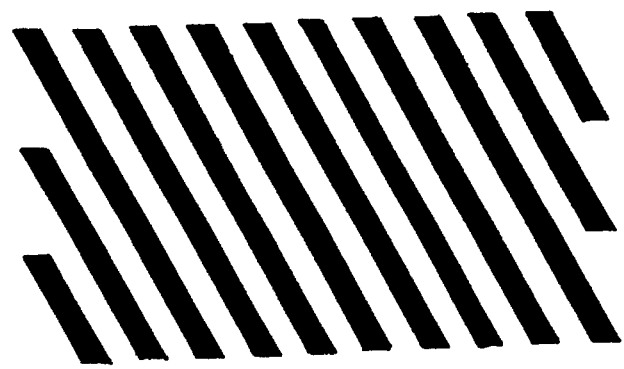

FIGS. 21A and 21B are schematic views which illustrate a case in which the substantially elongated pixels are transmitted by the colors described above (referring to the drawing, two colors are employed).

Referring to the drawings, slant and thick lines illustrate a status in which the image pattern is formed in substantially elongated shape by successively and adjacently disposing the pixels for each of the colors. FIG. 21A illustrates the pattern for the first color, while FIG. 21B illustrates the pattern for the second color.

Figure 22:
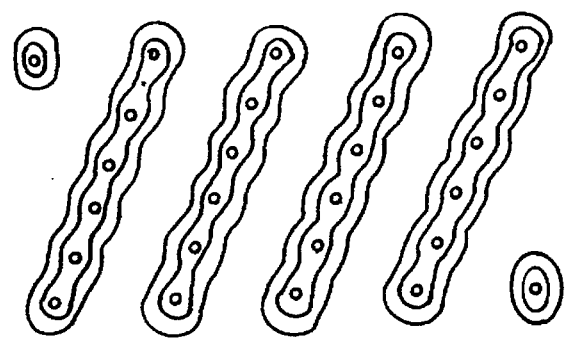
FIG. 22 illustrates an exposure distribution in which pixels are actually disposed.

Actually, the pixels are disposed to form an exposure pattern as shown in FIG. 22.

Figure 23A:
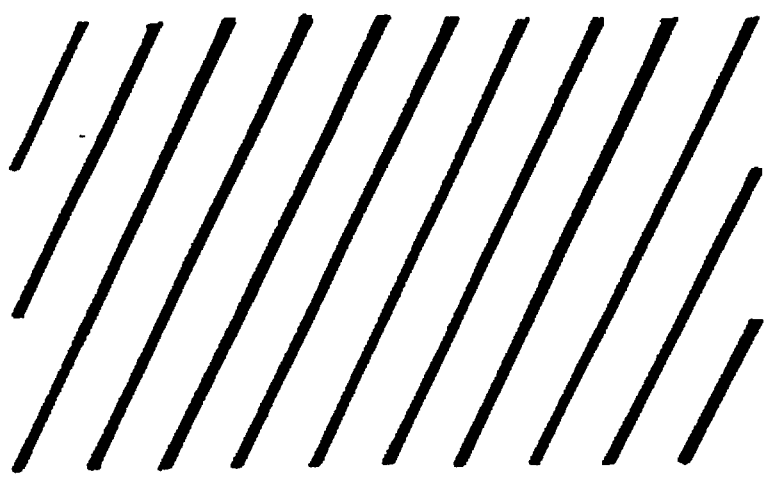
FIGS. 23A and 23B illustrate examples of the output of a highlight image according to the second embodiment of the present invention.
Figure 23B:
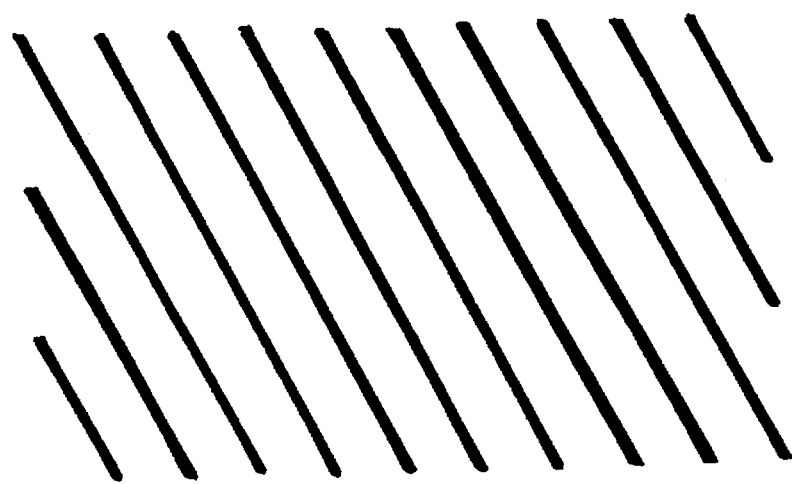

FIGS. 21A and 21B illustrate a state of an output of a halftone image, while FIGS. 23A and 23 illustrate a state of an output of a highlight image.

Figure 24A:
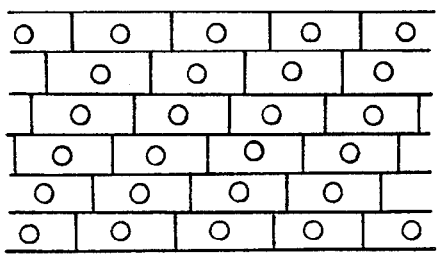
FIGS. 24A and 24B illustrate examples of the configuration of the first and second colors according to the second embodiment of the present invention.
Figure 24B:
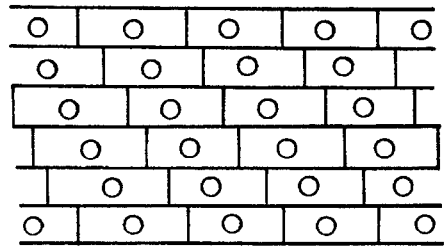

FIGS. 24A and 24B illustrate the configuration of the pixels for all of the colors and FIG. 24A illustrates that of the first color and FIG. 24B illustrates that of the second color.

According to this embodiment, the recording density in the main scanning direction is 160 dpi (5/2 pixel corresponds to 1 dot) and that in the sub-scanning direction is 400 dpi (1 pixel corresponds to 1 dot). The image forming angle is arranged to be 26.6° for the first color and −26.6° for the second color.

In order to position the pixels as described above, the resolution of the pattern signal generator 335 is arranged to be 200 dpi so that a pattern signal (triangular wave) as shown in FIGS. 25A and 25B is generated. In the shift register 337, the pattern signal (triangular wave) is delayed for each of the scanning lines by a quantity of delay as follows: the quantity of delay of the triangular wave for each of the colors is $4/5$ dot for the first color and $1/5$ dot for the second color.

According to this embodiment, in order to a further linear image from the latent image having a linear exposure distribution as shown in FIG. 22, a known two-component brush development method is employed in the developing means shown in FIG. 4.

Figure 26A:
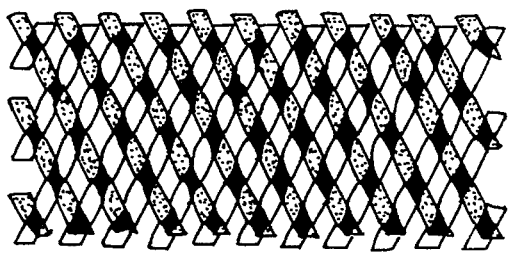
FIGS. 26A and 26B illustrate examples of output of a multicolor image according to the second embodiment of the present invention.
Figure 26B:
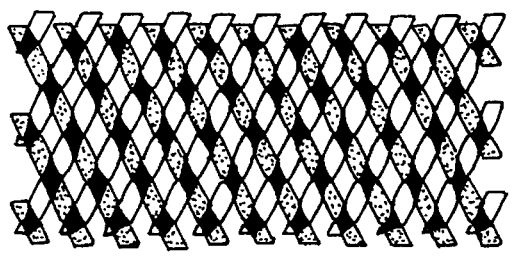

As described above, the pixels for the colors are successively arranged to respectively form substantially elongated shapes. Therefore, the overlapped pixels in the form of the substantially elongated shape effect to prevent the long period deterioration while maintaining the effects of the above-described halftone dot printing technology. Furthermore, a multicolor image without color tone change can be obtained regardless of the quantity of the small color deviations and large color deviations generated due to the multiplication of the colors since the area of the overlapped portion is not changed as shown in FIGS. 26A and 26B.

Figure 11:
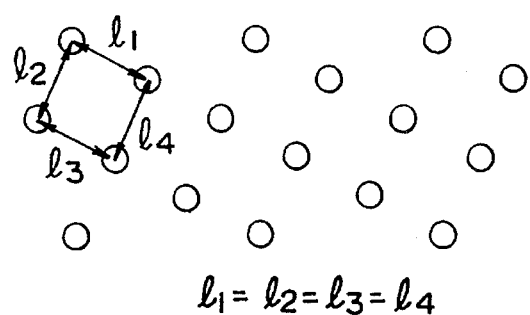
FIG. 11 illustrates positional deviations of dots at the time of beam scanning according to the conventional structure.
Figure 12:
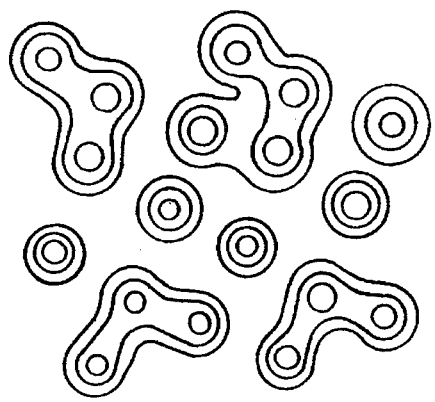
FIG. 12 illustrates irregular interference between dots at the time of the beam scanning according to the conventional structure.
Figure 13A:
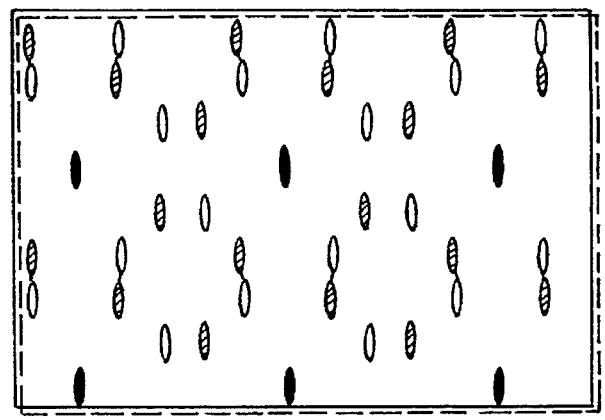
FIG. 13A and 13B illustrates the positions of pixels in the case where irregular color or color tone change takes place according to the conventional structure.
Figure 13B:
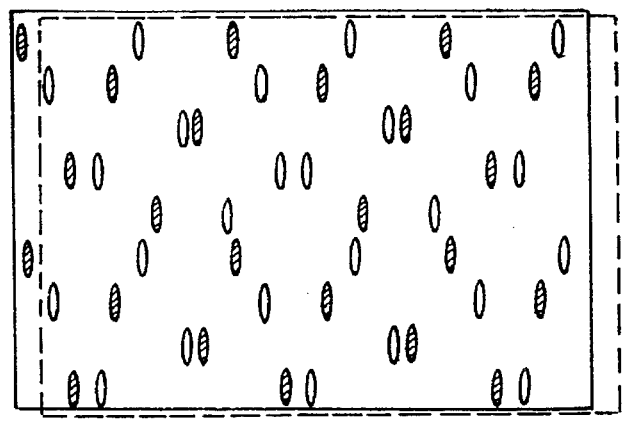

Furthermore, since the pixels are positioned adjacently to one another and are in the form of substantially the elongated shape, the side lobes of the light quantity distribution interfere with each other between the pixels. Therefore, even if the pixels are undesirably deviated, a further linearly formed image can easily be formed in comparison to isolated pixels positioned at constant intervals from the adjacent pixels as shown in FIG. 11. Therefore, the image deterioration for a short period such as the diagonal lines and the irregular pitch can be prevented.

As a method for positioning the pixels in substantially the elongated shape as described above, a variety of combinations might be considered feasible to be employed by properly determining the resolution of the pattern signal generator 335 with respect to the recording density in the sub-scanning direction and the quantity of delay arranged in the shift register 337.

For example, as shown in FIGS. 27A and 27B, in a case where the recording density in the main scanning direction is 200 dpi (3 pixels correspond to 1 dot) and that in the sub-scanning direction is 600 dpi (1 pixel corresponds to 1 dot), a pattern in which the image forming angle for the first color is 45° and that for the second color is −45° can be obtained by arranging the resolution of the pattern signal generator 335 to be 200 dpi, the quantity of delay of the triangular wave for the first color to be $1/3$ dot and that for the second color to be $-1/3$ ($=2/3$) dot.

In a case where the recording density in the main scanning direction is 300 dpi and that in the sub-scanning direction is 600 dpi, a pattern in which the image forming angle for the first color is 26.6° and that for the second color is −26.6° can be obtained by arranging the resolution of the pattern signal generator 335 to be 300 dpi, the quantity of delay of the triangular wave for the first color to be $1/4$ dot and that for the second color to be $3/4$ dot.

Although the image forming angle for each angle is arranged to be symmetrical with respect to the center line according to the above-described embodiments, a variety of combinations may be employed such that either of them is arranged to be 0° and another one is arranged to be 45°.

According to the above-described embodiments, although the pulse width modulation circuit is used, the present invention is not limited to this. For example, the present invention can similarly be applied to an LBP (Laser Beam Printer) which uses a threshold matrix.

FIGS. 28A to 28C illustrate examples of the threshold matrix, wherein a matrix of 6×6 is used as the basic matrix and one pixel corresponds to 400 dpi×400 dpi. FIG. 28A illustrates the matrix corresponding to the first color, FIG. 28B illustrates that corresponding to the second color and FIG. 28C illustrates that corresponding to the third color.

The threshold matrix enables the pattern in which the pixels are disposed in the substantially elongated shape to be obtained similarly to the above-described embodiments.

Figure 28F:
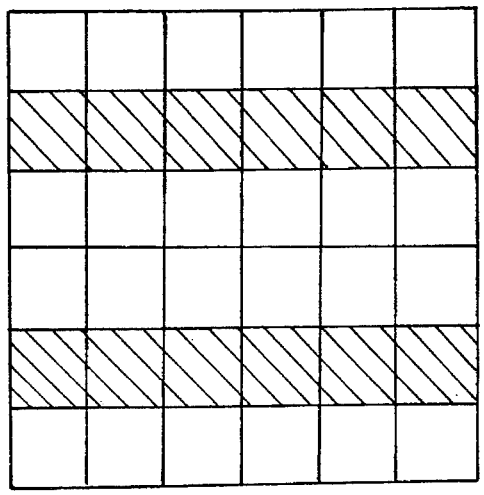
FIGS. 28D to 28F illustrate the result of the output of the pixels corresponding to the matrices shown in FIGS. 28A to 28C.
Figure 28E:
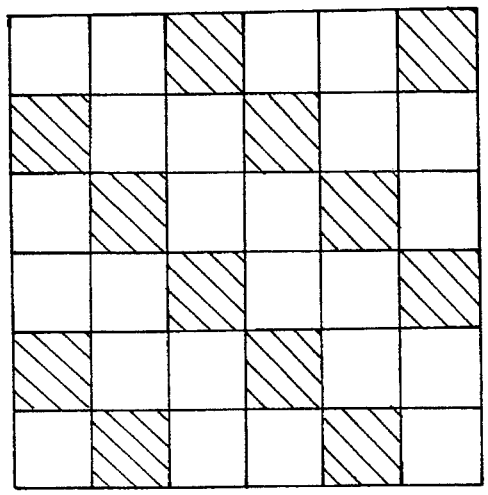
Figure 28D:
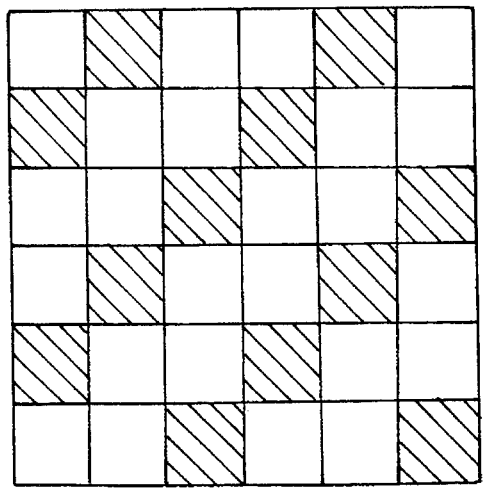

FIGS. 28D to 28F illustrate the results of the output from the pixels corresponding to the matrices shown in FIGS. 28A to 28C. When the halftone images of all of the three colors in level 4 are transmitted in accordance with the matrices shown in FIGS. 28A to 28C, a substantially elongated image is formed as shown in FIGS. 28D to 28F. As described above, the irregular pitch and the irregular color can be prevented between the first and the second colors, between the second and the third colors and between the third and the first colors.

The threshold matrices are not limited to those shown in FIGS. 28A to 28C. Any pattern capable of forming the output image in the form of an elongated shape can, of course, be employed.

Furthermore, although the structure for forming a multiplied image realized by two or three colors is employed according to the above-described embodiments, the present invention is not limited to this. The present invention can effectively be applied to all of the multiplied images using two or more colors.

An object of this embodiment is to remove the irregular pitch and irregular color. The irregular pitch can be generated due to the visibility characteristics. However, Yellow does not generate an excessive irregular-pitch. The color deviation can be generated due to mechanical characteristics. For example, the first and the fourth colors generate the color deviation from the second and the third colors. The structures arranged to use two or more color are the embodiments to overcome at least either of the above-described two problems in terms of the deviation. For example, if any one of the four colors encounters the problem in terms of the deviation, the subject color suffering from the problem and other three colors are arranged to have different patterns to form the image. That is, if any one of the colors encounters problem, the elongated shape according to this embodiment is arranged to be different in the image forming angle between the subject pixels and pixels for the other three colors.

Then, it will be described with reference to a full color image.

FIGS. 51A to 51D illustrate an example of forming substantially elongated full color image. As shown in FIGS. 51A to 51D, the Yellow does not generate the excessive irregular pitch. However, the other three colors, that is, Magenta, Cyan and Block generate the irregular pitch respectively.

As described above, according to the present invention, the pixels are positioned adjacently to each other and in the form of the substantially elongated shape in a predetermined direction, a multicolor overlapped image without the image quality deterioration such as the irregular color, the irregular pitch and undesirable non-uniform lines can be stably formed.

Third Embodiment

According to a third embodiment of the present invention, a color image forming apparatus which can be used in a laser beam printer is provided.

The structure of this embodiment will now be described.

Figure 29:
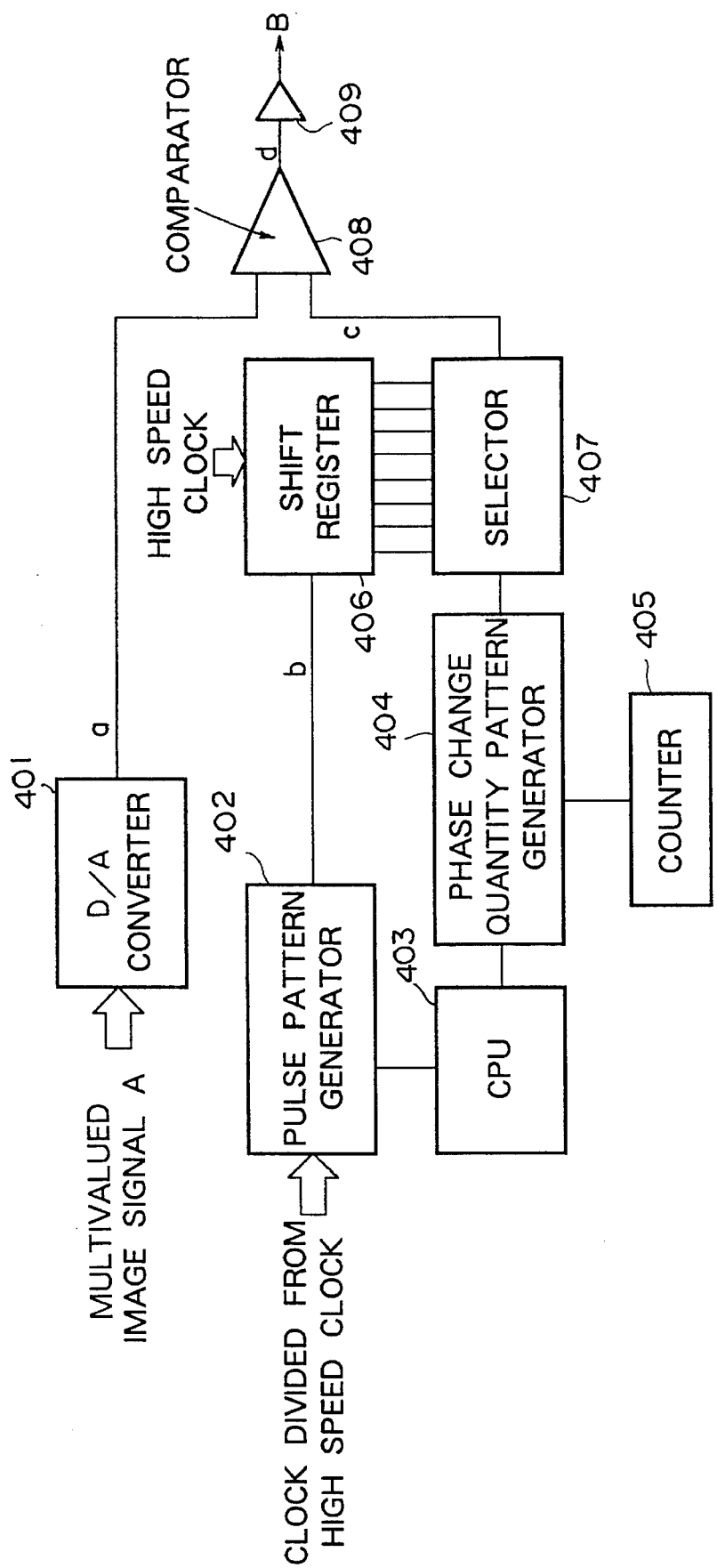
FIG. 29 is a block diagram which illustrates the structure of a color image forming device according to a third embodiment of the present invention.

FIG. 29 is a block diagram which illustrates the third embodiment of the color image forming apparatus according to the present invention. Referring to FIG. 29, reference numeral 401 represents a D/A converter for converting the digital color image signal into an analog signal. Reference numeral 402 represents a pulse pattern generator for generating a pulse pattern for use in the pulse modulation of the analog color image signal. Reference numeral 408 represents a comparator for performing the pulse width modulation by making a comparison between the analog color image signal transmitted from the D/A converter 401 and the pulse pattern transmitted from the pulse pattern generator 402. Reference numeral 409 represents an amplifier for amplifying a PWM signal transmitted from the comparator 408.

Reference numeral 406 represents a shift register for delaying the pulse pattern generated by the pulse pattern generator 402. Reference numeral 407 represents a selector for selecting a delay pattern formed by the shift register 406 in accordance with the pattern transmitted from a phase change quantity pattern generator 404 to be described later.

According to this embodiment, the unit of the quantity of delay is arranged to be a delay of 1/4 pixel in a case where the reference unit of the PWM is arranged in such a manner that one unit is composed of two pixels. Therefore, 8 types of PWM patterns are formed due to the delay of the shift register 405. Therefore, the selector 7 is a circuit for selecting a delay pattern from the 8 types of the delay patterns formed by the shift register 406 so as to output the selected one. That is, the selector 407 delays by $D_M$ pixel for each line in the case of M (Magenta), delays by $D_Y$ pixel for each line in the case of Y (Yellow), delays by $D_c$ pixel for each line in the case of C (Cyan) and delays by $D_{BK}$ pixel for each line in the case of Bk (Black).

Reference numeral 405 represents a counter for counting a horizontal synchronizing signal. The counter 405 is a circuit for repeatedly counting the horizontal signals from "1" to "8" in such a manner that the same is counted up to "8" the counting is again started from "1". Reference numeral 404 represents a phase change quantity pattern generator which comprises, for example, a RAM which stores patterns for the corresponding colors. The phase change quantity pattern generator 404 transmits the result of the counting and the pattern formed in accordance with a control signal transmitted from a CPU 403 to be described later to the selector 407. Reference numeral 403 represents the CPU which transmits pattern signal for the corresponding colors to the pulse pattern generator 402 so as to control the final output from the selector 407. Furthermore, the CPU 403 controls the generation of the performed for each of the color components so that the colors are overlapped.

Figure 30A:
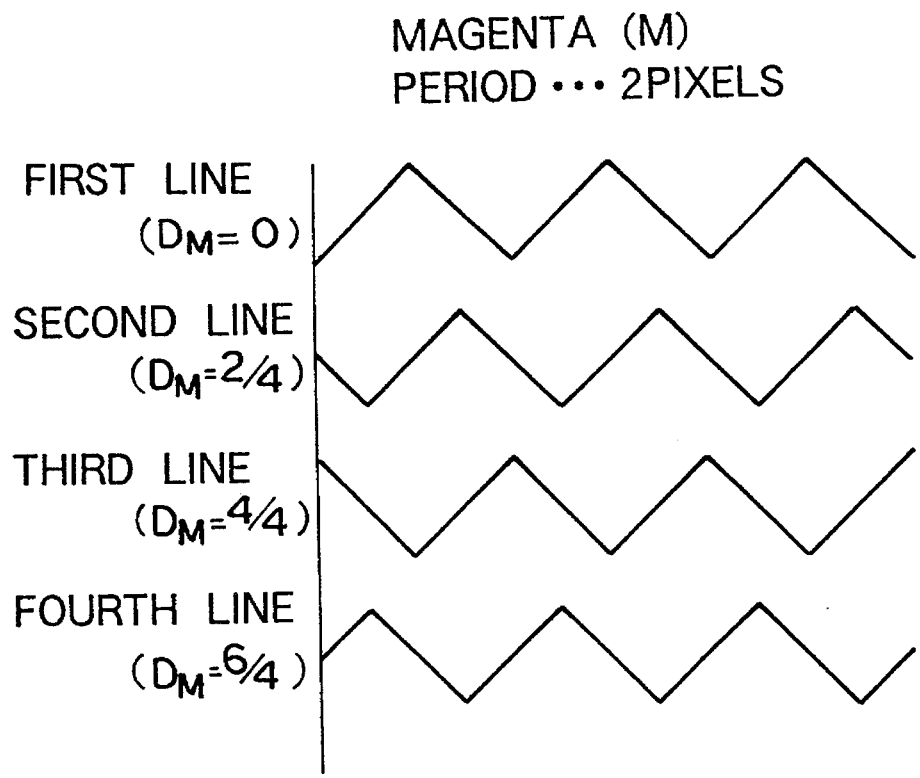
FIGS. 30A to 30D illustrate examples of reference signals for the colors according to the third embodiment of the present invention.
Figure 30B:
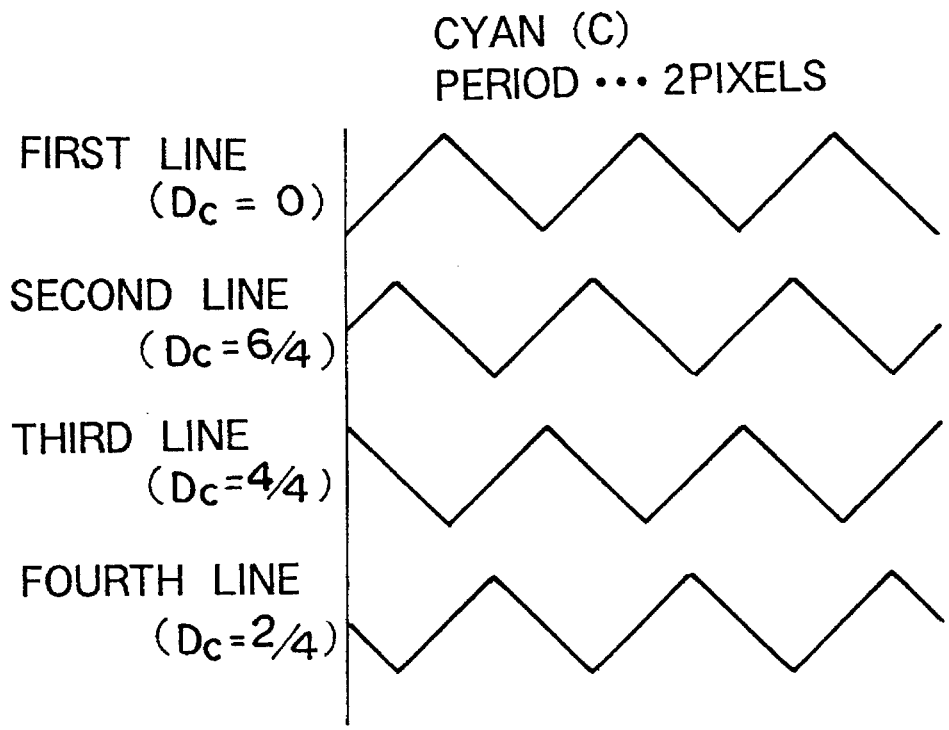
Figure 30C:
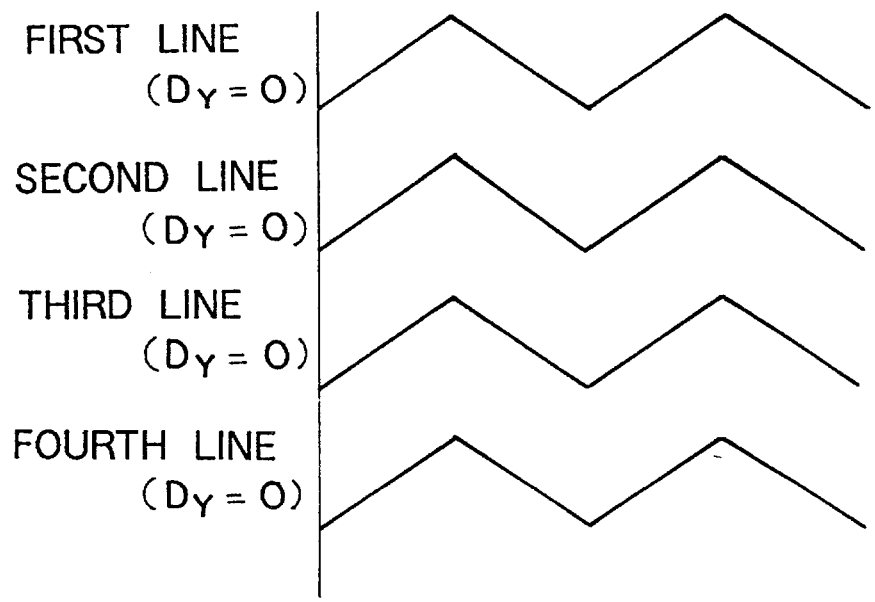
Figure 30D:
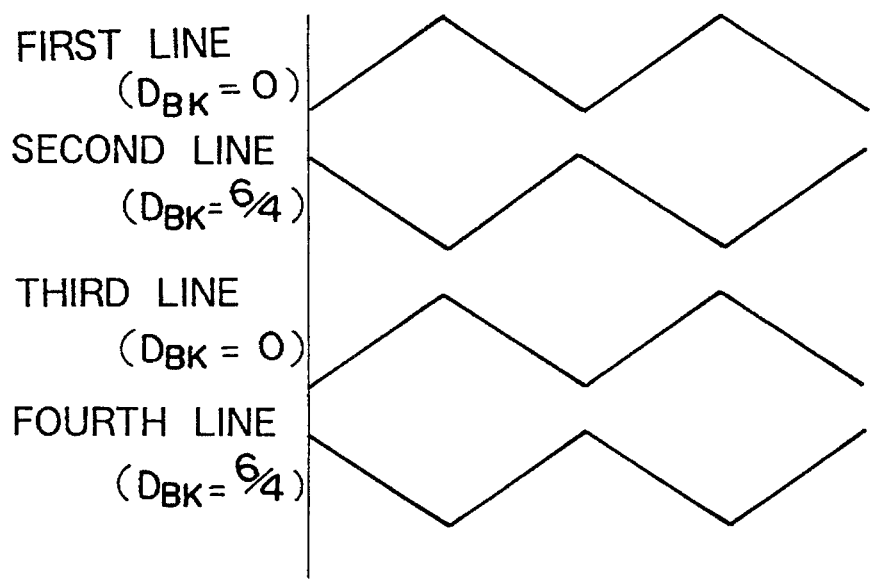

FIGS. 30A to 30D are waveform drawings which illustrate examples of the reference signal (triangular wave) for M, C, Y and Bk. The triangular signals for use at the time of forming an image of Magenta (M) has, as shown in FIG. 30A, a referential period (two pixels) serving as a reference. Therefore, it is generated at a quantity of delay $D_M$=degree corresponding to 0 pixel for the first line, at a delay quantity $D_M$=degree corresponding to 2/4 pixel for the second line, at a delay quantity $D_M$=degree corresponding to 4/4 pixel for the third line and at a delay quantity $D_M$=degree corresponding to 6/4 pixel for the fourth line (the delay quantities DM from the fifth line employ the repeated delay quantities for the first to the fourth lines). The positions of the dot to be recorded in response to the reference signal are designated by symbol "O" in FIG. 31A.

The triangular signal for use at the time of forming the Cyan (C) image has a reference period (two pixels) so that the delay quantity Dc for each of the first to the fourth lines is arranged to be 0, 6/4, 4/4 and 2/4.

The triangular signal for use at the time of forming the Yellow (Y) image has a period (three pixels) which is 1.5 times the reference period. The delay quantity $D_Y$ is arranged to be "0" for all of the lines. pattern signal in the phase change quantity pattern generator 404.

Then, the operation of the above-described color image forming apparatus will now be described.

The color components of the multicolor image signal (four types of digital signals for M, C, Y and Bk according to this embodiment) are successively converted into an analog signal a by the D/A converter 401. On the other hand, a reference signal b (according to this embodiment, it is a triangular wave) determined for each color component is processed under a control of the CPU 403 by utilizing a clock divided from a high speed clock by a pulse pattern generator 402. The reference signal b is then supplied to the shift register 406 so as to be delayed.

The reference signal b is delayed by the shift register 406 in accordance with the 8 patterns before the selector 407 selects any one of the delayed reference signal so as to transmit it as a reference signal c.

The reference signal c is subjected to a comparison with the analog signal a by the comparator 408 so that a PWM signal d is generated. The PWM signal d is amplified by the amplifier 409 so as to be transmitted as a processed signal B. In accordance with the thus transmitted signal B, a laser semiconductor (omitted form illustration) is operated so that an image is formed by the electronic photography method. The above-described operation is The triangular signal for use at the time of forming the Black (Bk) image has a reference period (two pixels). The delay quantity $D_{BK}$ is arranged to be "0" for the odd number lines and 6/4 for the even number lines.

Figure 31B:
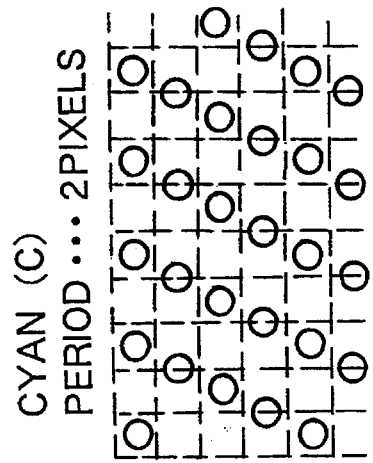
FIGS. 31A to 31D illustrate the recording positions of pixels in response to reference signals which corresponds to each color according to the third embodiment of the present invention.
Figure 31D:
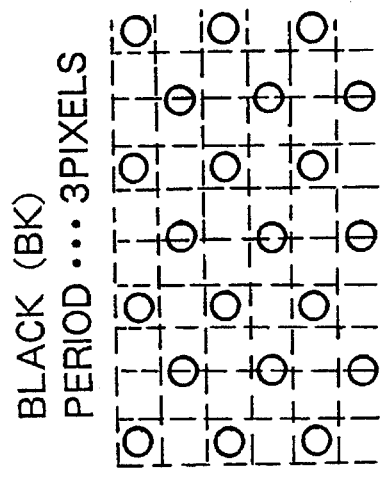
Figure 31A:
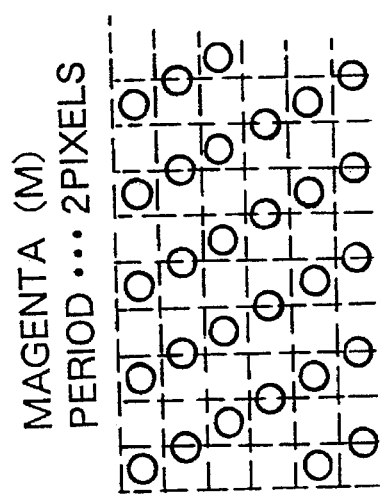
Figure 31C:
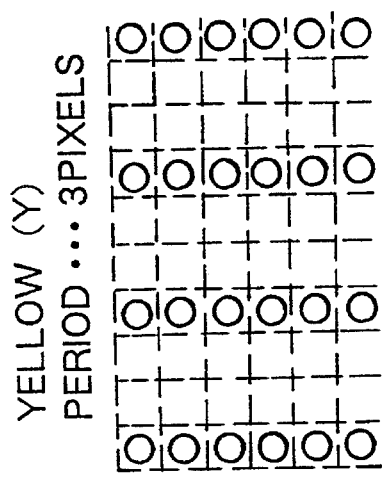

The positions of the pixels for Cyan (C), Yellow (Y) and Black (Bk) to be recorded are shown in FIGS. 31B to 31D.

Figure 32A:
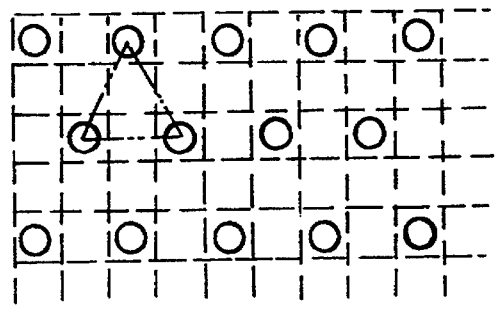
FIGS. 32A to 32C illustrate only overlapped pixels in a case where pixels of two different colors are overlapped according to the third embodiment of the present invention.
Figure 32B:
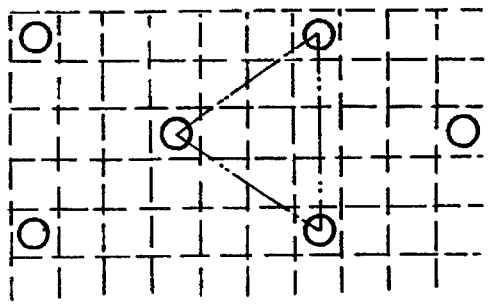
Figure 32C:
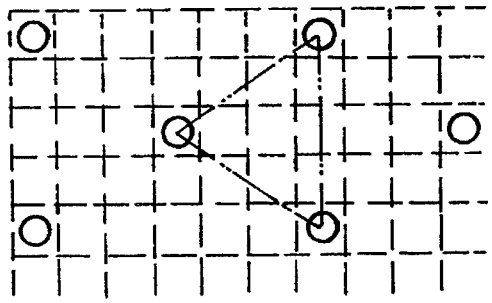
Figure 33B:
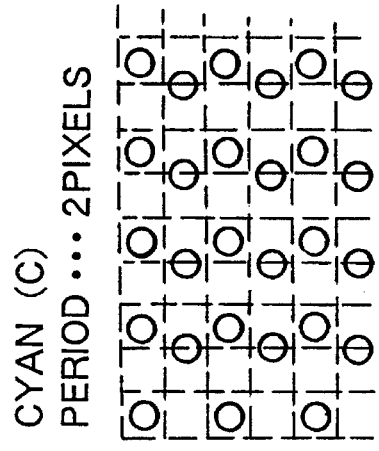
FIGS. 33A to 33D illustrate the recording positions of the pixels corresponding to each color according to a first modification to the third embodiment of the present invention.
Figure 33D:
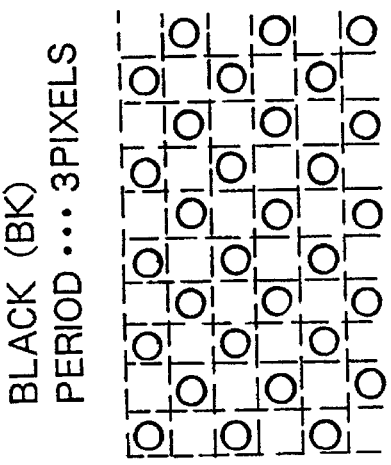
Figure 33A:
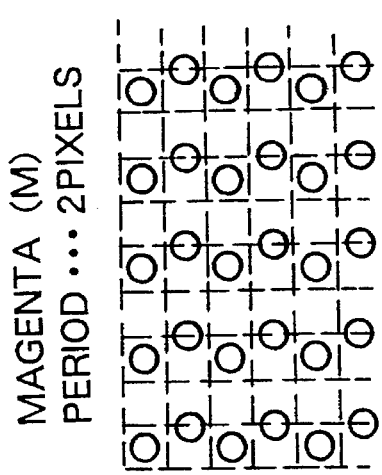
Figure 33C:
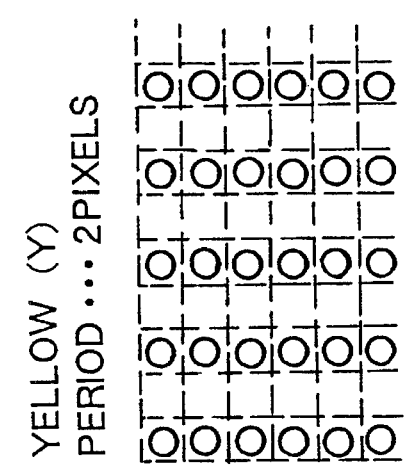

FIGS. 32A to 32C illustrate only the overlapped dots when two different dots are overlapped. When images of M, C, Y and Bk are formed as described above, the overlapped dots at the positions to be recorded when M and C are overlapped are shown in FIG. 32A. The three adjacent overlapped dots are positioned at the verteces of a substantially equilateral triangle. The overlapped dots when C and Y are overlapped or Y and M are overlapped are, as shown in FIG. 32C, positioned in such a manner that the three adjacent overlapped dots are positioned at the verteces of a substantially equilateral triangle.

As described above, according to this embodiment, the overlapped dots and the non-overlapped dots are generated in a short period. Therefore, the long period irregular color due to the irregular rotation of the polygonal mirror can be prevented. As a result, even if the color deviation (deviation of the resistance) takes place, the color tone change can be prevented.

In particular, a significant effect can be obtained in a case where the plurality of adjacent pixels are positioned to form a regular polygon when color dots are overlapped to form an image.

First Modification

A first modification is arranged in such a manner that the positions of the dots of M, C, Y and Bk are arranged as shown in FIGS. 33A to 33D. As an apparatus for forming the image by the manner as described above, the apparatus (see FIG. 29) according to the above-described embodiment may be employed as it is. In this case, the contents of the phase change quantity pattern generator 404 must be reloaded.

Figure 34A:
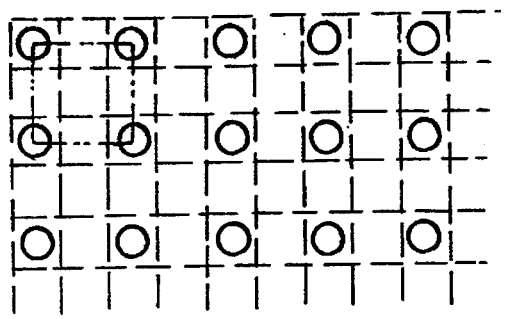
FIGS. 34A to 34C illustrate dichroic overlapped pixels according to the first modification to the third embodiment of the present invention.
Figure 34B:
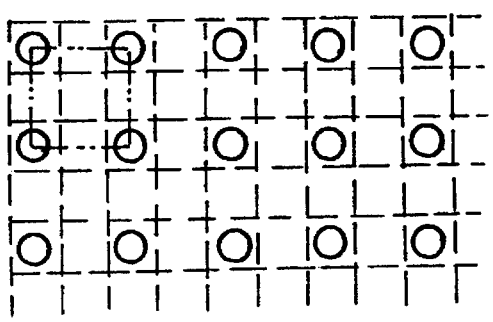
Figure 34C:
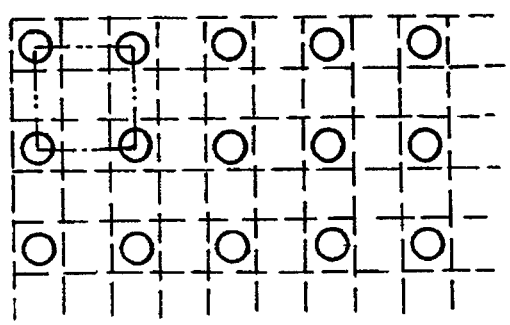

In this case, the overlapped dots when M and C, M and Y, and C and Y are overlapped are positioned at the verteces of a square as shown in FIGS. 34A to 34C.

Second Modification

Figure 35A:
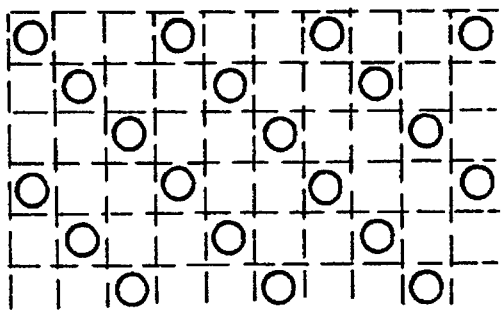
FIGS. 35A to 35C illustrate the recording positions for the corresponding colors according to a second modification to the third embodiment of the present invention.
Figure 35B:
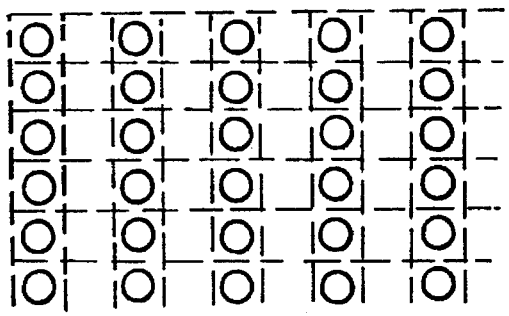
Figure 35C:
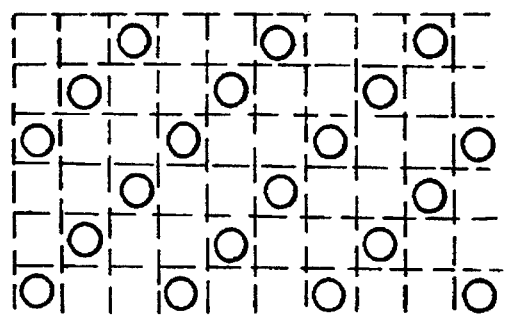
Figure 36A:
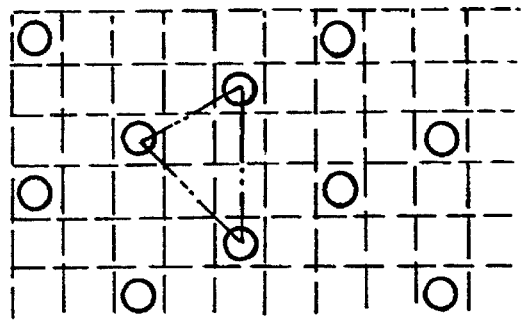
FIGS. 36A to 36C illustrate the overlapped pixels according to the second modification to the third embodiment of the present invention.
Figure 36B:
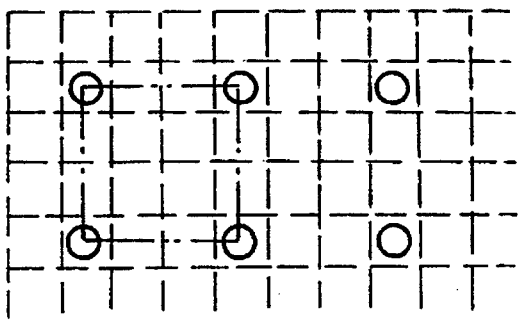
Figure 36C:
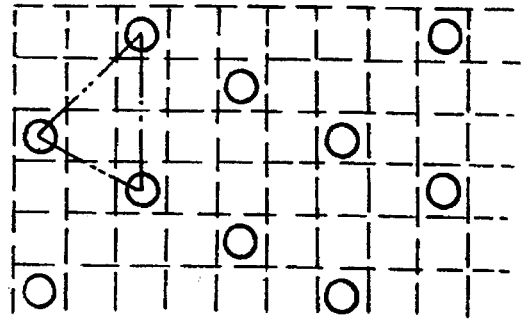
Figure 37A:
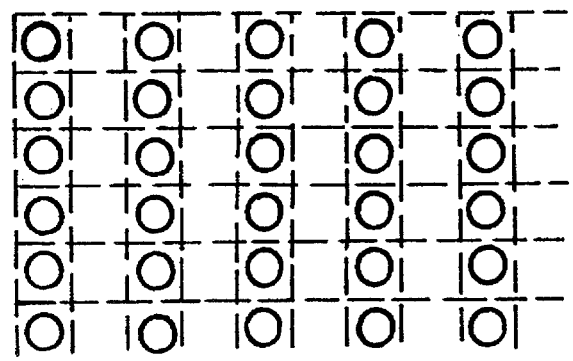
FIGS. 37A, 37B, 39A and 39B illustrate the recording positions of the pixels according to the period and the phase of the pixels to be recorded.
Figure 37B:
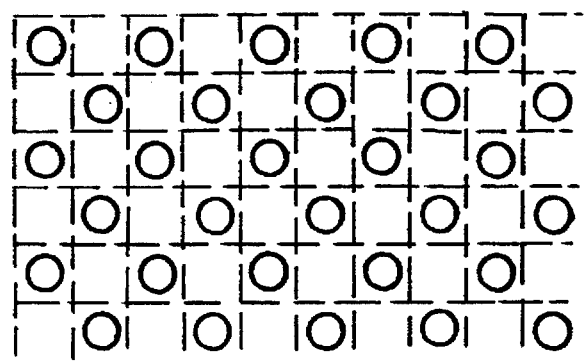

A second modification is arranged in such a manner that dots having different color components are arranged as shown in FIGS. 35A to 35C. In the case where M, C and Y are arranged as shown in FIGS. 35A to 35C, the overlapped dots of the M and C, M and Y and C and Y are as shown in FIGS. 36A to 36C. In the case where the M and C are overlapped or the case where C and Y are overlapped, the overlapped dots are positioned at the verteces of a substantially eqilateral triangle. In the case where M and Y are overlapped, the overlapped dots are positioned at the verteces of a square.

Figure 38:
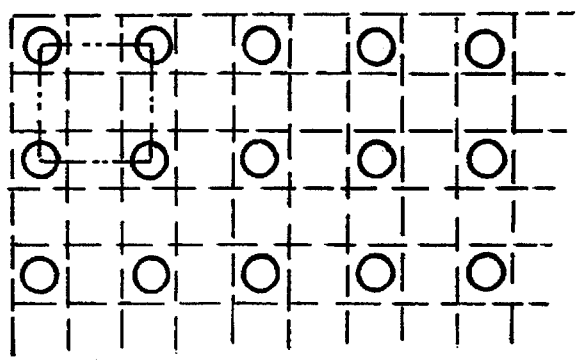
FIGS. 38 and 40 illustrate the overlapped pixels according to the recording positions shown in FIGS. 37A and 37B or 39A and 39B.
Figure 39A:
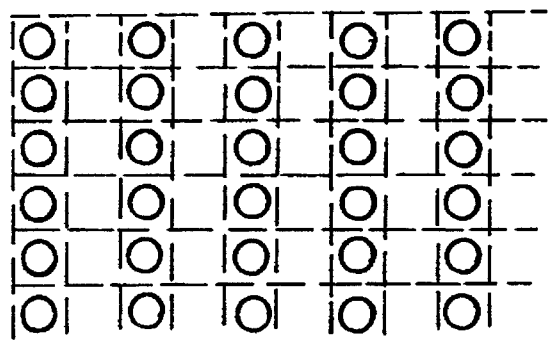
Figure 39B:
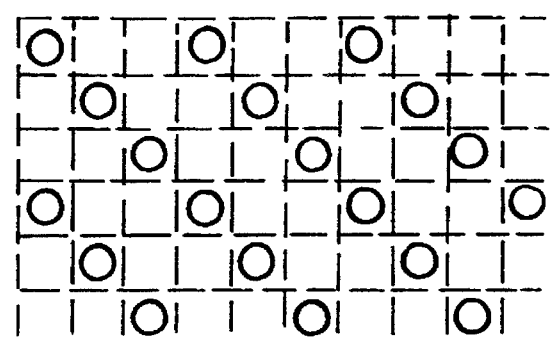
Figure 40:
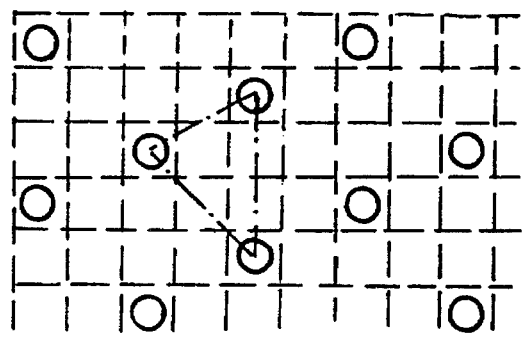

According to the above-described embodiments and modifications, the full color image is formed. However, the present invention can be applied to a case in which the image is formed by two colors such as Black and red. In this case, the image may be formed at the period and the phase of the dots of the optional two color components among all of the colors to be recorded according to the above-described embodiments. However, structures may be employed in which the period and the phase of the pixels to be recorded are arranged to be as shown in FIGS. 37A, 37B, 39A and 39B. The overlapped dots in this case are shown in FIGS. 38 and 40.

As described above, according to this embodiment, the image is repeatedly formed at a plurality of phases for each of the lines for each of the color components. Furthermore, the period of the dots for the corresponding colors are determined so as to periodically position the overlapped dots for at least one line. Therefore, the overlapped dots are periodically positioned in the longitudinal and the lateral directions. That is, the dots on which a plurality of colors overlap and the pixels on which no pixel overlaps are periodically generated. Therefore, if a positional deviation is taken place for one color component, the overlapped dot and the non-overlapped dot are deviated from each other, causing no change in the color tone to be generated. Furthermore, since the overlapped dots and the non-overlapped dots are generated in a short period, the long period irregular color can be prevented.

According to the above-described embodiments, a modulation method such as the PWM is employed. However, the present invention is not limited to this. For example, the present invention may, of course, be employed in an LBP printer or an LED printer which use the brightness modulation.

Furthermore, a significant effect can be obtained from a case in which the present invention is employed in a printer which uses the reference signal and which will generate irregular scanning in the main scanning direction such as an LBP Printer, a thermal printer, an LED printer and an ink jet printer.

As described above, according to the present invention, the combination of the period of the reference signal and the delay quantity of the reference signal for each lines is changed for each of the colors so as to place the plurality of adjacent dots of the overlapped dots at the position to be recorded at the verteces of a substantially regular polygon for at least two color components. Therefore, the irregular color and the color deviation can be prevented and the color tone change for each print can also be prevented. As a result, a stable image can always be formed.

Fourth Embodiment

A fourth embodiment is arranged in such a manner that a color image processing apparatus for use in a laser beam printer.

First, an example of the pulse width modulation according to this embodiment will now be described.

Figure 42A:
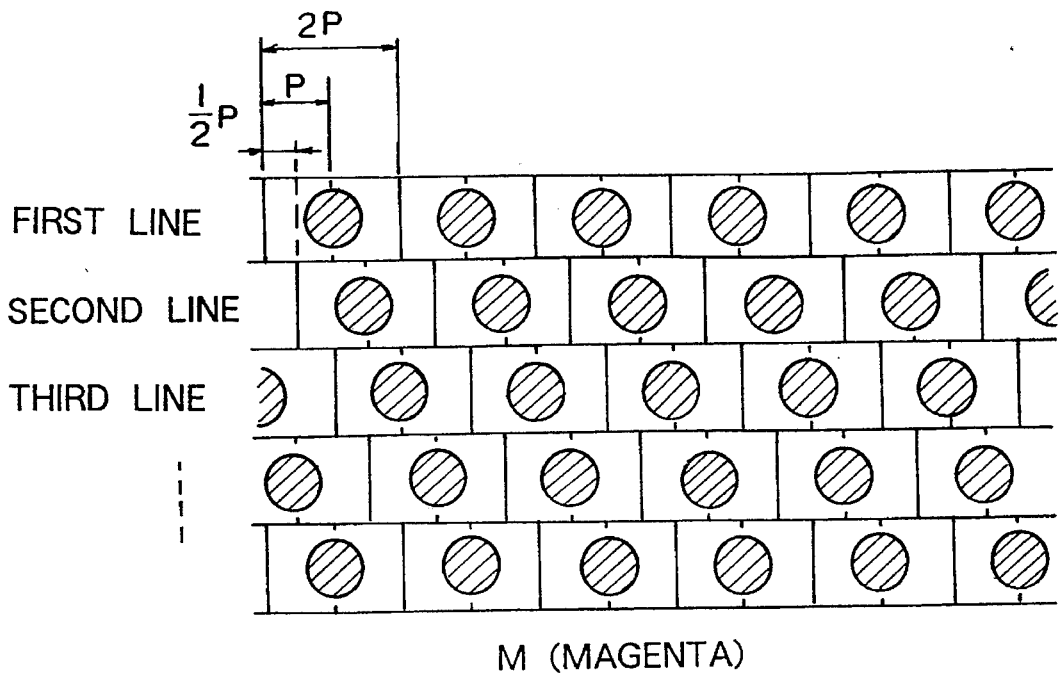
FIGS. 42A to 42D illustrate output patterns after the pulse width modulations performed to correspond to each color according to a fourth embodiment of the present invention.
Figure 42B:
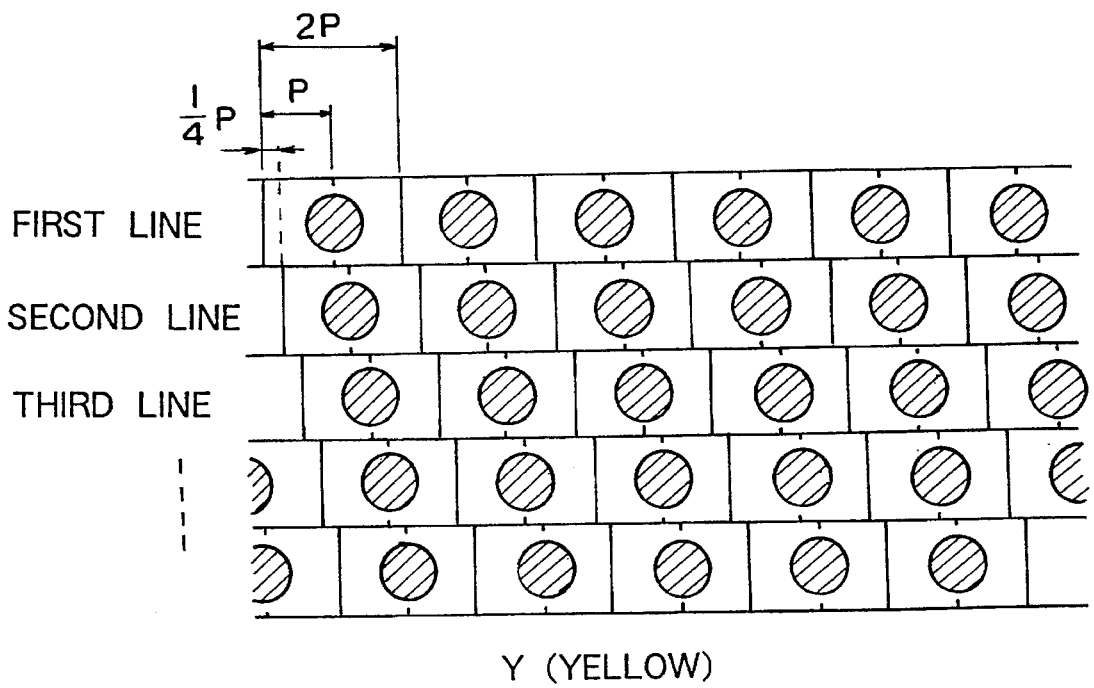
Figure 42C:
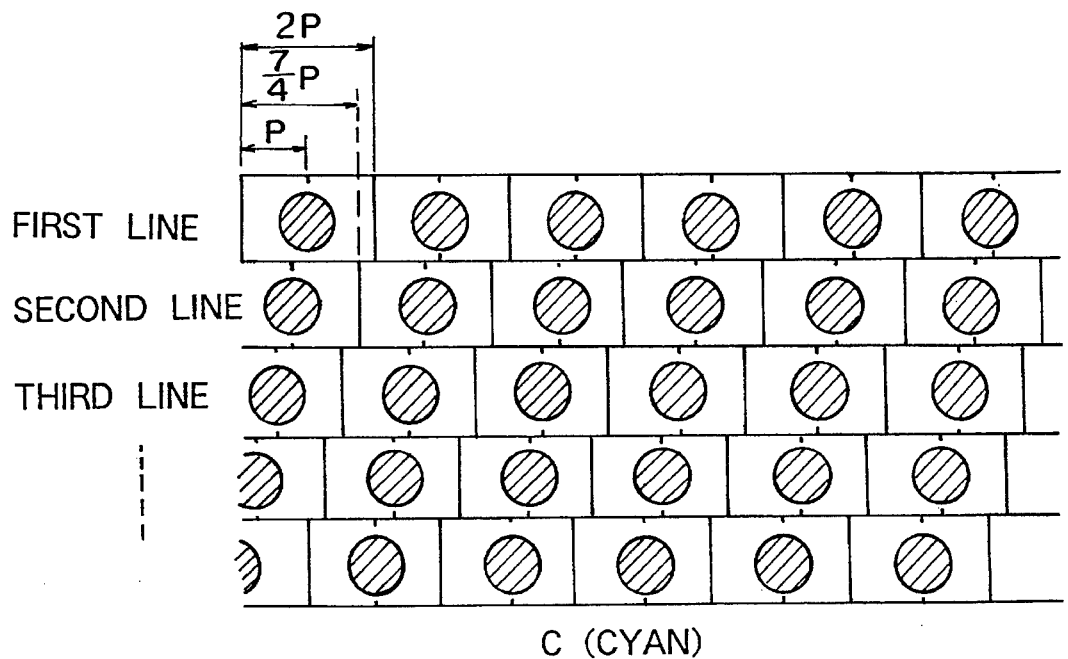
Figure 42D:
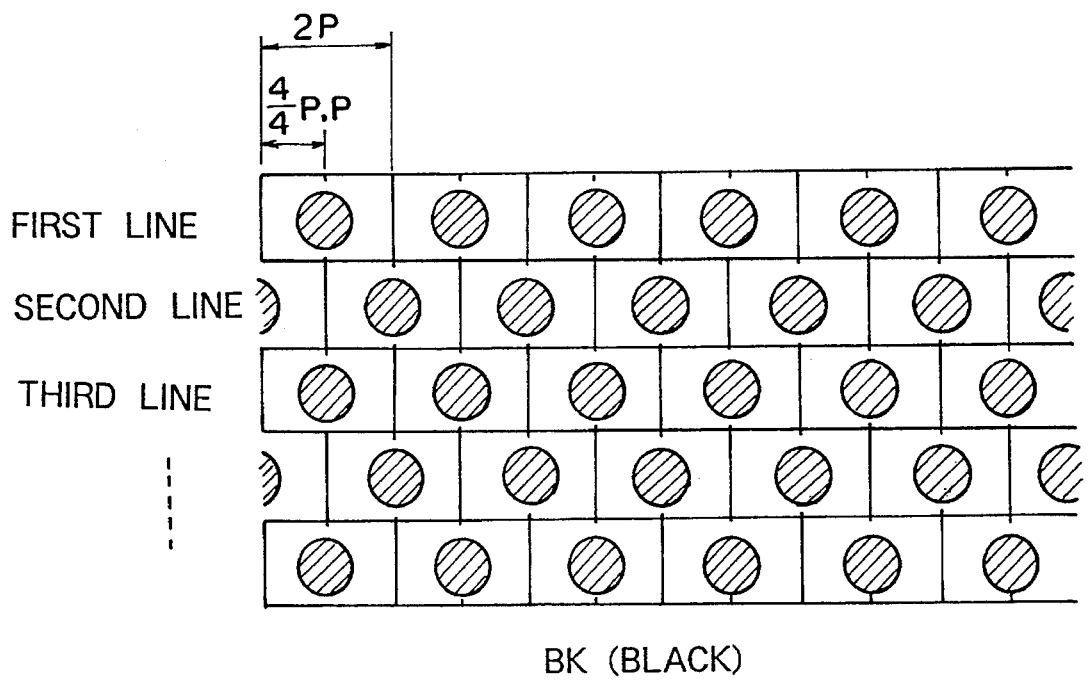

FIGS. 42A to 42D illustrate a fourth embodiment of output patterns of the pulse width modulation (PWM) for the corresponding colors. One unit of the PWM is arranged to be two pixels (2P). According to this embodiment, the phase is, as shown in FIG. 42A, deviated by 1/2 pixel (P/2) for each line in a case of M (Magenta). The phase is, as shown in FIG. 42B, deviated by 1/4 pixel (P/2) for each line in a case of Y (Yellow). The phase is, as shown in FIG. 42C, deviated by 7/4 pixel (7P/4) for each line in a case of C (Cyan). The phase is, as shown in FIG. 42D, deviated by 4/4 pixel (4P/4) for each line in a case of Bk (Black). As a result, the dots are overlapped at random depending upon the position when Y, M, C and Bk are overlapped.

Then, the structure of this embodiment will now be described.

Figure 41:
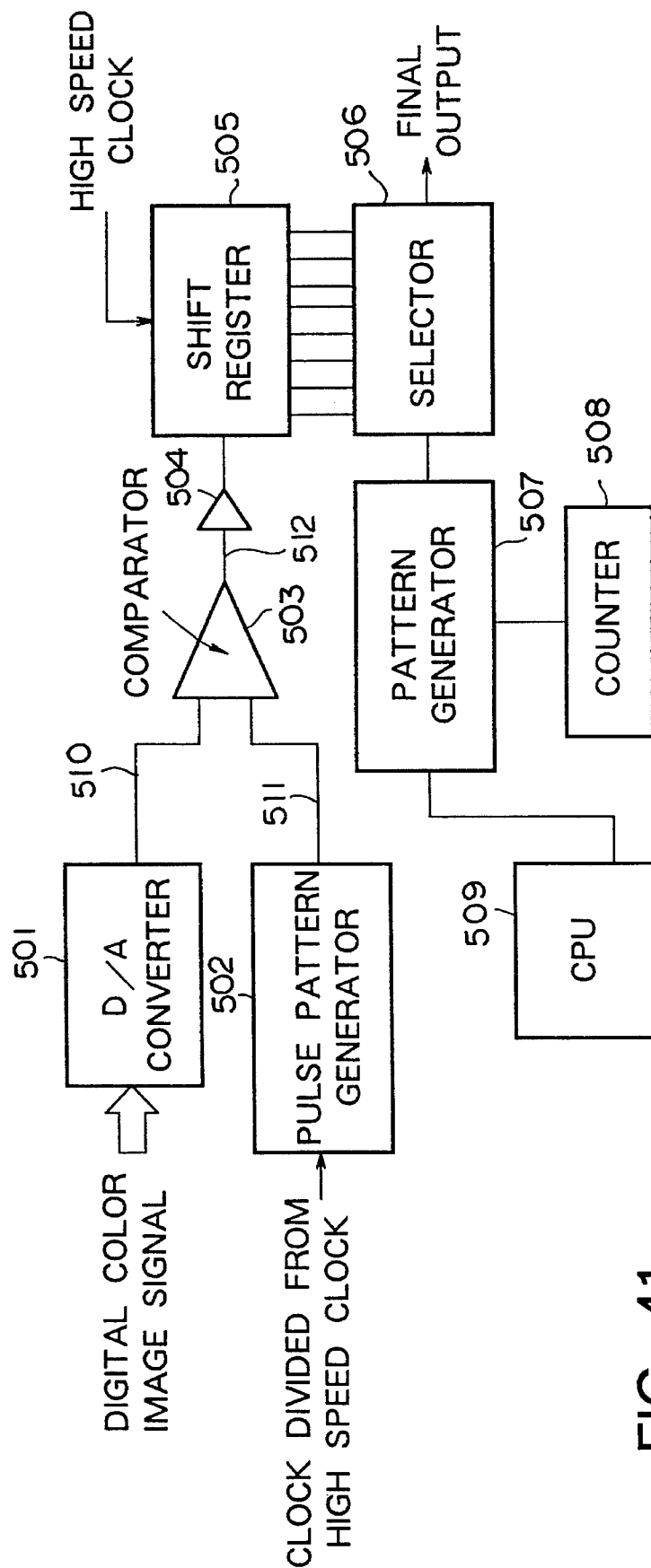
FIG. 41 is a block diagram which illustrates the structure of the color image processing apparatus according to a fourth embodiment of the present invention.

FIG. 41 is a block diagram which illustrates the structure of a fourth embodiment of the color image processing apparatus according to the present invention. Referring to the drawing, reference numeral 501 represents a D/A converter for converting a digital color image signal into an analog signal. Reference numeral 502 represents a pulse pattern generator for generating the pulse pattern for use in the pulse modulation of the analog color image signal. Reference numeral 503 represents a comparator for performing the pulse width modulation by making a comparison between the analog color image signal transmitted from the D/A converter 501 and the pulse pattern transmitted from the pulse pattern generator 502.

Reference numeral 504 represents an amplifier for amplifying the PWM signal transmitted from the comparator 503. Reference numeral 505 represents a shift register for delaying the amplified PWM signal. Reference numeral 506 represents a selector for selecting a delay pattern formed in the shift register in accordance with the pattern transmitted from a pattern generator 507 to be described later. According to this embodiment, One unit of the PWM is arranged to be composed of two pixels and the unit of the delay quantity is arranged to be a delay of 1/4 pixel. Therefore, 8 types of PWM patterns are formed due to the delay of the above-described shift register 5. Therefore, the selector 506 selects a delay pattern from the 8 types of the delay patterns formed by the shift register 505, the selector then transmitting the selected pattern as the final output to a printer mechanism portion (omitted from illustration). That is, as shown in FIGS. 42A to 42D, the selector 506 delays by 1/2 pixel for each line in the case of M (Magenta), delays by 1/4 pixel for each line in the case of Y (Yellow), delays by 3/4 for each line in the case of C (Cyan) and delays by 4/4 pixel for each line in the case of Bk (Black).

Reference numeral 508 represents a counter for counting the horizontal synchronizing signal. The counter 508 is a circuit arranged to count the horizontal signals from 1 to 8 in such a manner that, when 8 horizontal synchronizing signals are counted, it again starts the counting from one. Reference numeral 507 represents a pattern generator which comprises a RAM which stores patterns for the corresponding colors. The pattern generator 507 transmits the pattern which corresponds to the result of the counting issued from the counter 057 to the selector 506. The final output from the selector 506 is controlled. Reference numeral 509 represents a CPU which transmits patterns for the corresponding colors to the pattern generator 507 so as to control the final output from the selector 506.

Then, the operation of the above-described color image processing apparatus will now be described.

Figure 44:
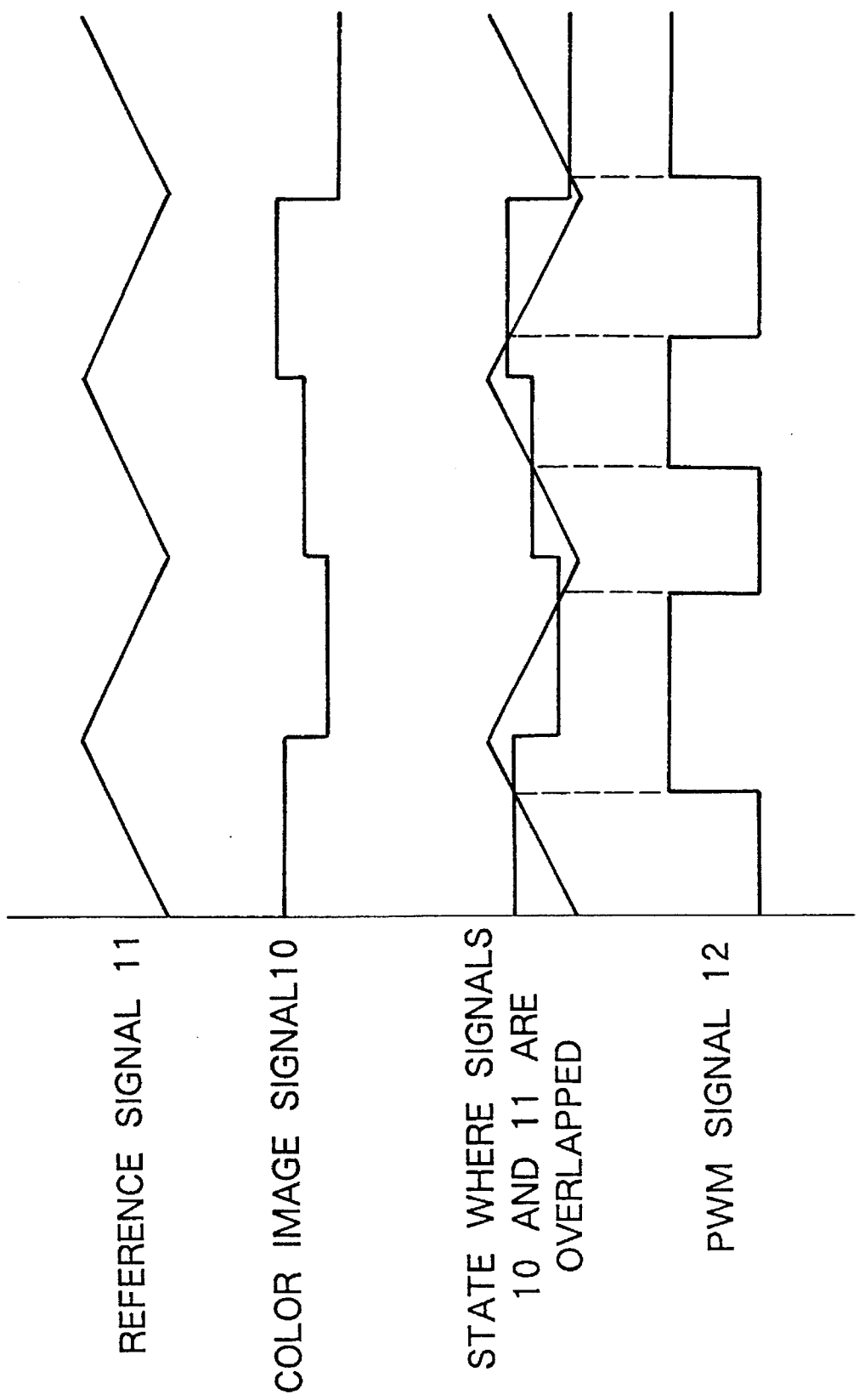
FIG. 44 illustrates a method of forming a pulse width modulation signal according to the fourth embodiment of the present invention.
Figure 45A:
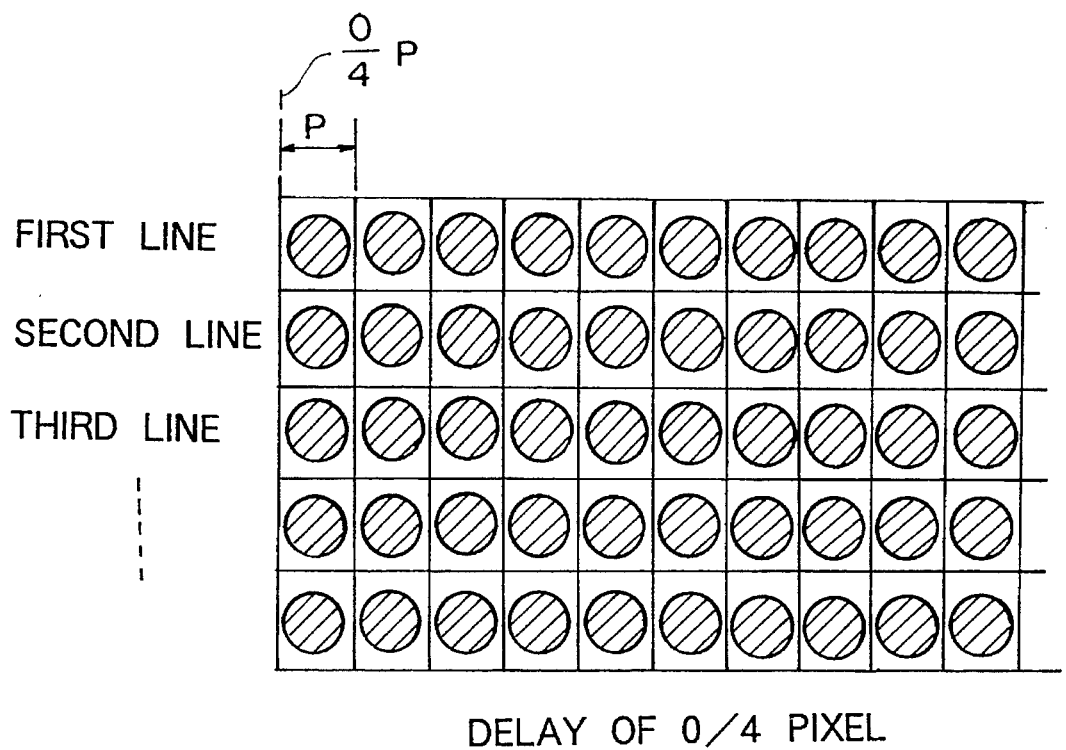
FIGS. 45A to 45D illustrate output patterns after the pulse width modulations performed to correspond to each color according to the fourth embodiment of the present invention.
Figure 45B:
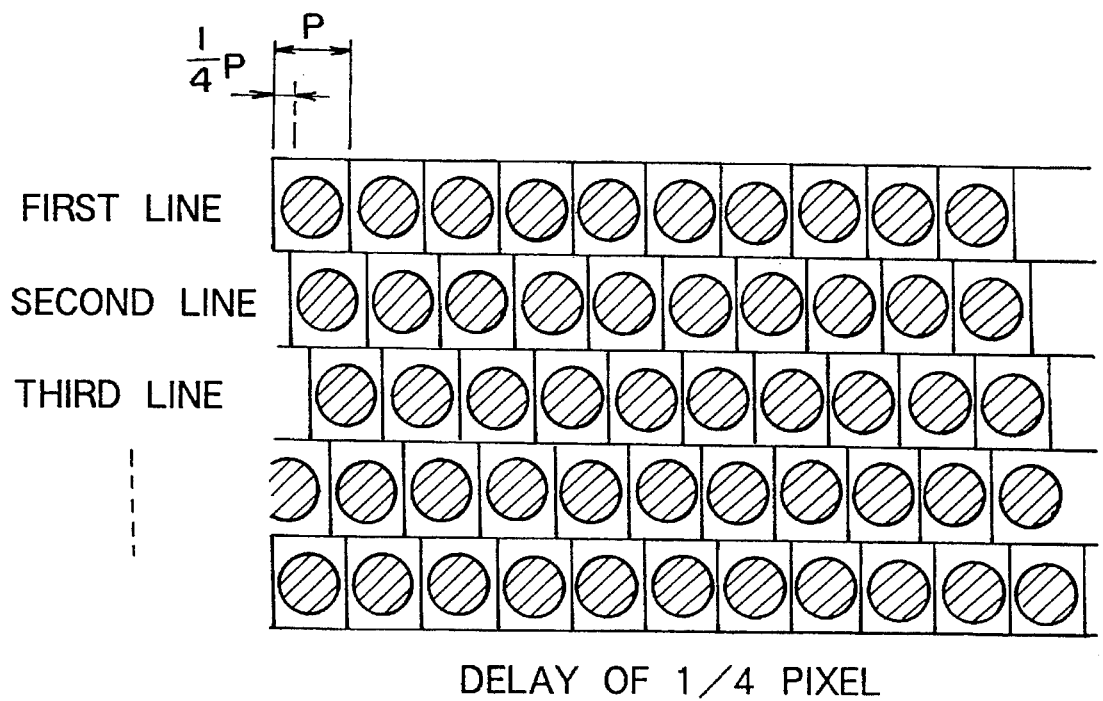
Figure 45C:
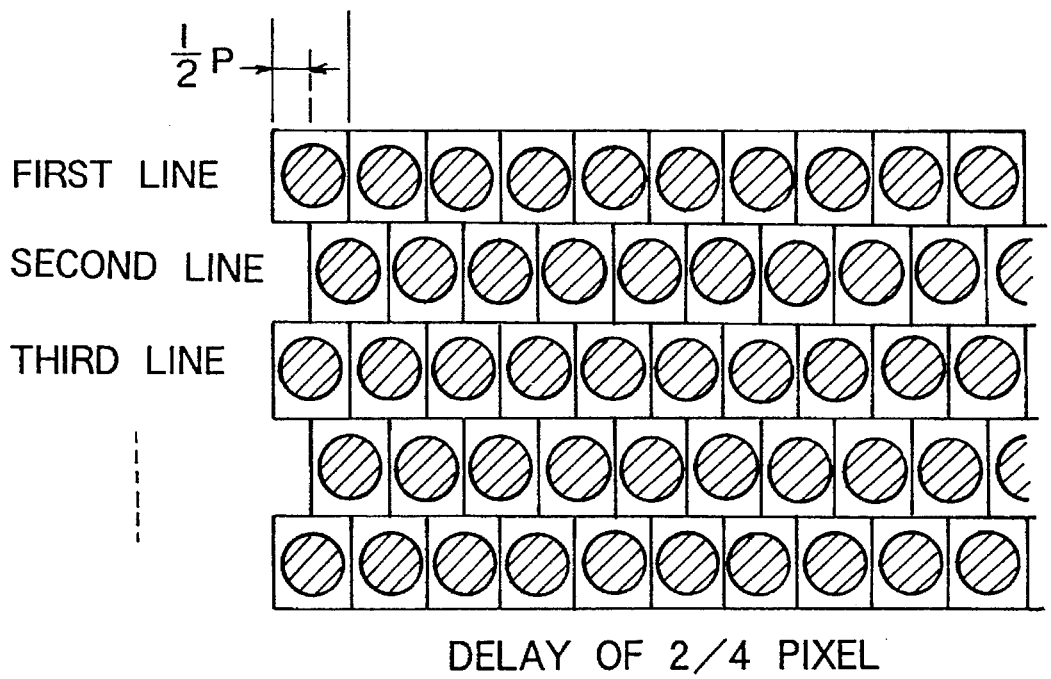
Figure 45D:
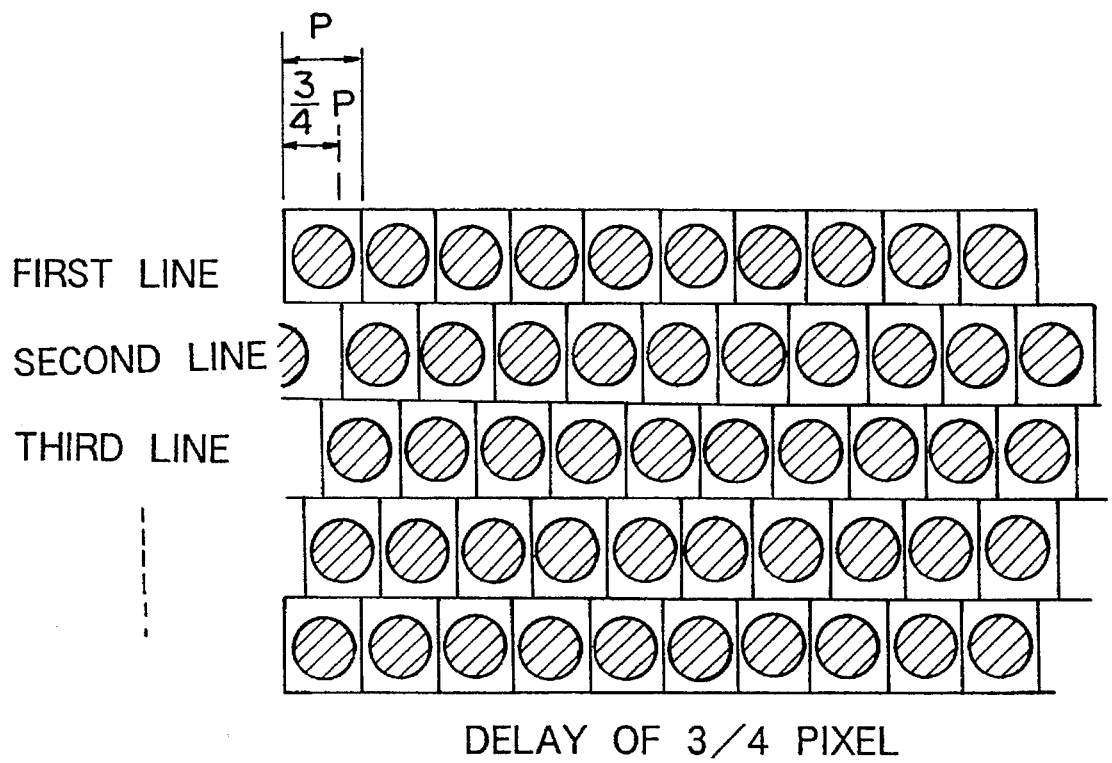

FIG. 43 is a timing chart which illustrates the timing and illustrates an example of the final output according to this embodiment. FIG. 44 illustrates a method of forming the PWM signal according to this embodiment. A multivalued digital color image signal (any one of Y, M, C and Bk) supplied from an image reader (omitted from illustration) is converted into an analog signal by the D/A converter 501. On the other hand, the pulse pattern generator 502 makes the reference signal (triangular wave) by a clock divided from a high speed clock. Furthermore, a PWM signal 512 is formed by a comparison made between the analog color image signal 510 and the reference signal 511 by the comparator 503.

The comparator 503 receives the reference signal 511 supplied from the pulse pattern generator 502 and the analog color image signal 510 supplied from the D/A converter 501. It transmits the PWM signal 512 the generation period of which is the period of the coincide two points in the period of the reference signal 511 when the two signals are subjected to a comparison, that is, the two signals are, as shown in FIG. 44, overlapped, the PWM signal 512 being transmitted to the shift register 505 via the amplifier 504.

When the PWM signal 512 is supplied to the shift register 505, it is delayed by the shift register 505. The selector 506 selects any one of the 8 types of the delay patterns of in the shift register 505. The 8 delay patterns are the patterns realized by the PWM signals delayed by 0/4 to 7/4 pixel.

Delay pattern information for causing the selector 506 to select for each line has been previously written in the pattern generator 507 depending upon the color. The counter 507 increments the count of the horizontal synchronizing signals. On the other hand, the selector 506 selects the delay pattern from the shift register 505 in accordance with the pattern written in the pattern generator 507 so as to transmit it. FIGS. 43 illustrates the timing at which the pattern (final output) of Y (Yellow) shown in FIG. 42B is transmitted. In the case of Y (Yellow), the delay of 1/4 pixel is made for each line. Therefore, the final output is performed with a delay of "0" for the first line, with a delay of "1/4" for the second line and with a delay of "2/4" for the third line. Similarly, although omitted from illustration, the final output is performed in the case of M (Magenta) with a delay of "0" for the first line, with a delay of "2/4" for the second line and with a delay of "4/4" for the third line. The final output is performed in the case of C (Cyan) with a delay of "0" for the first line, with a delay of "7/4" for the second line and with a delay of "6/4" for the third line. The final output is performed in the case of Bk (Black) with a delay of "0" for the first line, with a delay of "4/4" for the second line and with a delay of "0/4" for the third line.

As described above, when the final output for all of the line for each of the colors has been ended, the final output for another color is started. Thus, above-described operations are performed for all of the colors stored in the pattern generator 507. As the final print, Y, M, C and Bk are overlapped.

As described above, according to this embodiment, the output pattern is changed for each of the colors. Therefore, irregular color and color tone change for each print due to the problems taken place in the color laser printer can be prevented, the problems being exemplified by the irregular rotation of the motor for the polygonal mirror, the deviation of the register for each of the colors and the irregular speed of the paper conveyance system. Furthermore, the image quality can always be stabilized.

According to the above-described embodiment, four patterns are generated by using the pattern generator 507. A random generating circuit may be employed so as to vary the delay patterns for the four colors.

According to the above-described embodiment, the delay of the output pattern for each of Y, M, C and Bk is, as shown in FIGS. 42A to 42D, arranged in such a manner that Y: 1/4 pixel, M: 2/4 pixel, C: 7/4 pixel and Bk: 4/4 pixel. The present invention is not limited to this. A variety of modifications may be made within the scope of the present invention. In this case, the combination of Y, M, C and Bk and the delay may be arranged in such a manner that Y: 2/4 pixel, M: 1/4 pixel, C: 4/4 pixel and Bk: 7/4 pixel. Furthermore, any four types of the combinations may be selected from the 8 types of the combinations 0/4 to 7/4.

According to the above-described embodiment, the two pixels are arranged to form one unit. The present invention is not limited to this. The one unit may be composed of a number of pixels other than two.

Modification

FIGS. 45A to 45D illustrate a modification to this embodiment of the output pattern of the PWM signal for each of the colors. As shown in FIGS. 45A to 45D, combinations in terms of the delay becomes 0/4 to 3/4 (0/4 to 3/4P) in the case where the one unit is composed of one pixel.

Although the method of the delay is made in accordance with the period for each 8 lines in the structure shown in FIGS. 42A to 42D, the same is made in accordance with the period for each 4 lines in the structure shown in FIGS. 45A to 45D. The reason for this lies in that the delay quantity is arranged to be in units of 1/4 pixel. However, since the delay can be varied depending upon the method of dividing the clock, the unit of the delay can be made to be $1/2^n$ pixel by dividing the clock by $2^n$ (where n is a constant).

According to the above-described embodiment, the pattern generator comprising the RAM is employed. The present invention is not limited to this. Another structure may be employed in which the pattern generator 7 comprises a ROM into which patterns for the four colors (Y, M, C and Bk) so as to process the patterns by switching the address for each of the colors by using the counter 8.

According to the above-described embodiment, the description is made about the laser beam printer. The present invention is not limited to this. The present invention can, of course, be employed in a facsimile machine having an output mechanism which employs the laser beam method.

As described above, according to the present invention, the generation of the irregular color and the undesirable color tone change for each print can be prevented. Furthermore, the image quality can always be stabilized.

Fifth Embodiment

FIGS. 46A to 46D illustrate the PWM output patterns for the corresponding colors according to this embodiment. According to this embodiment, the one unit of the PWM is arranged to be two pixels. In the case of M (Magenta), the phase is delayed by 1/2 pixel for each line. In the case of Y (Yellow), the phase is delayed by 1/4 pixel for each line. In the case of C (Cyan), the phase is delayed by 7/4 pixel for each line. In the case of Bk (Black), the phase is delayed by 4/4 pixel for each line. As a result, the dots can be overlapped at random when Y, M, C and Bk are overlapped.

Figure 47:
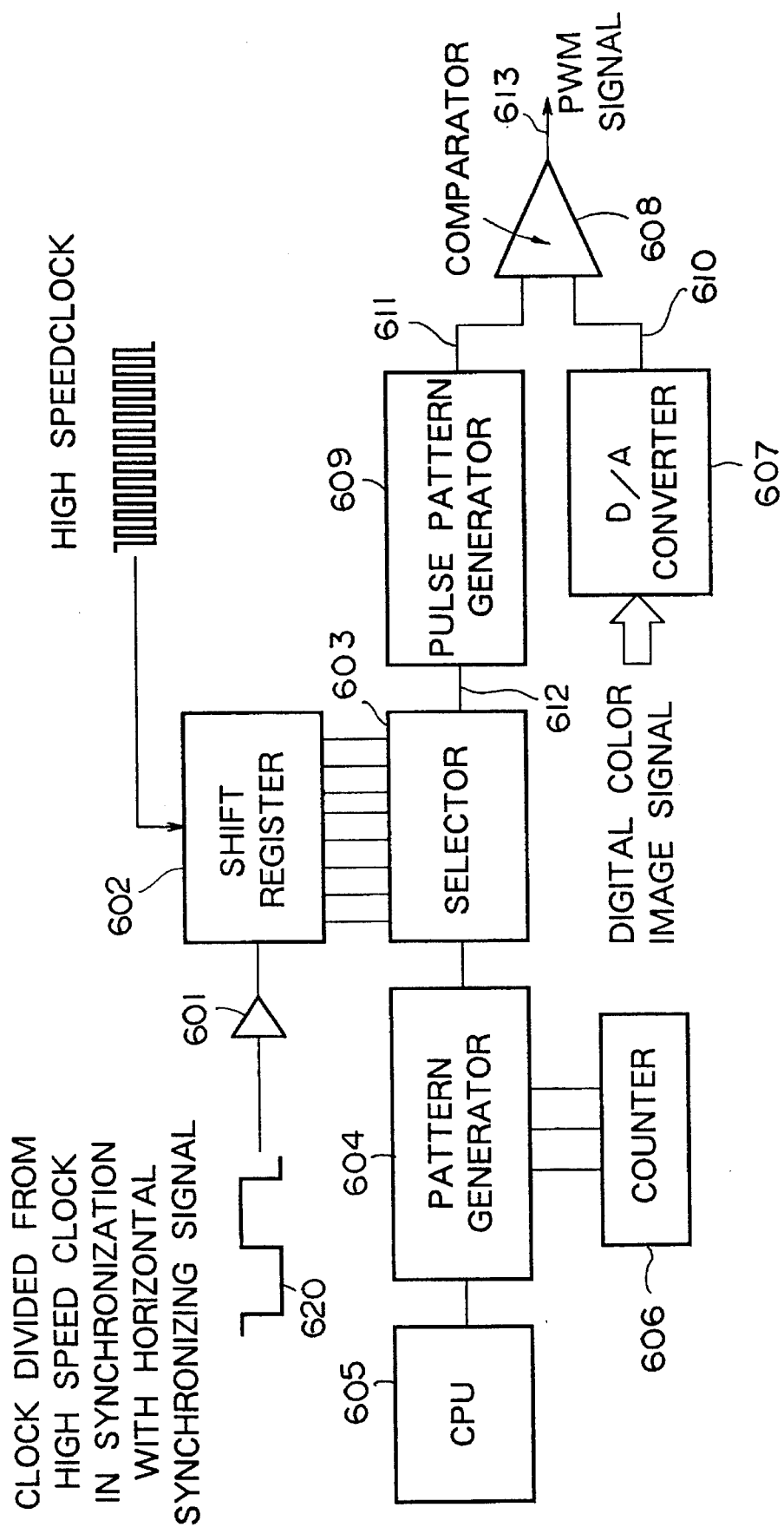
FIG. 47 is a block diagram which illustrates the structure of a circuit for generating a reference signal for use in the pulse width modulation according to a fifth embodiment of the present invention.

FIG. 47 is a block diagram which illustrates a circuit for generating the reference signal for PWM according to this embodiment.

As shown in FIG. 47, a clock 620 divided from a high speed clock is amplified by an amplifier 1 before it is supplied to a shift register 602, the clock 620 being then delayed. As shown in FIGS. 46A to 46D, the one unit of the PWM (Pulse Width Modulation) is arranged to be composed of 2 pixels and the unit of the delay quantity is arranged to be 1/4 pixel so that 8 types of delay clocks are formed.

The delay clocks are, as shown in the timing chart shown in FIG. 48, 2-0, 2-1, . . . , 2-7. The selector 3 shown in FIG. 47 selects one delay clock from the 8 types of the delay clocks transmitted from the shift register 602. The selector 603 receives the selection pattern supplied from a pattern generator 604 so that one delay clock is selected from the 8 types of the delay clocks in accordance with the selection pattern.

The pattern generator 604 comprises a RAM into which the selection pattern for the delay clock to be selected by the selector 605 for each of the lines is written. The selection patterns different in accordance with the color are written by a CPU 605. The pattern generator 604 may comprise a ROM into which the selection patterns for the four colors have previously been written. In this case, the similar control can be performed by switching the address in accordance with the color.

Figure 48:
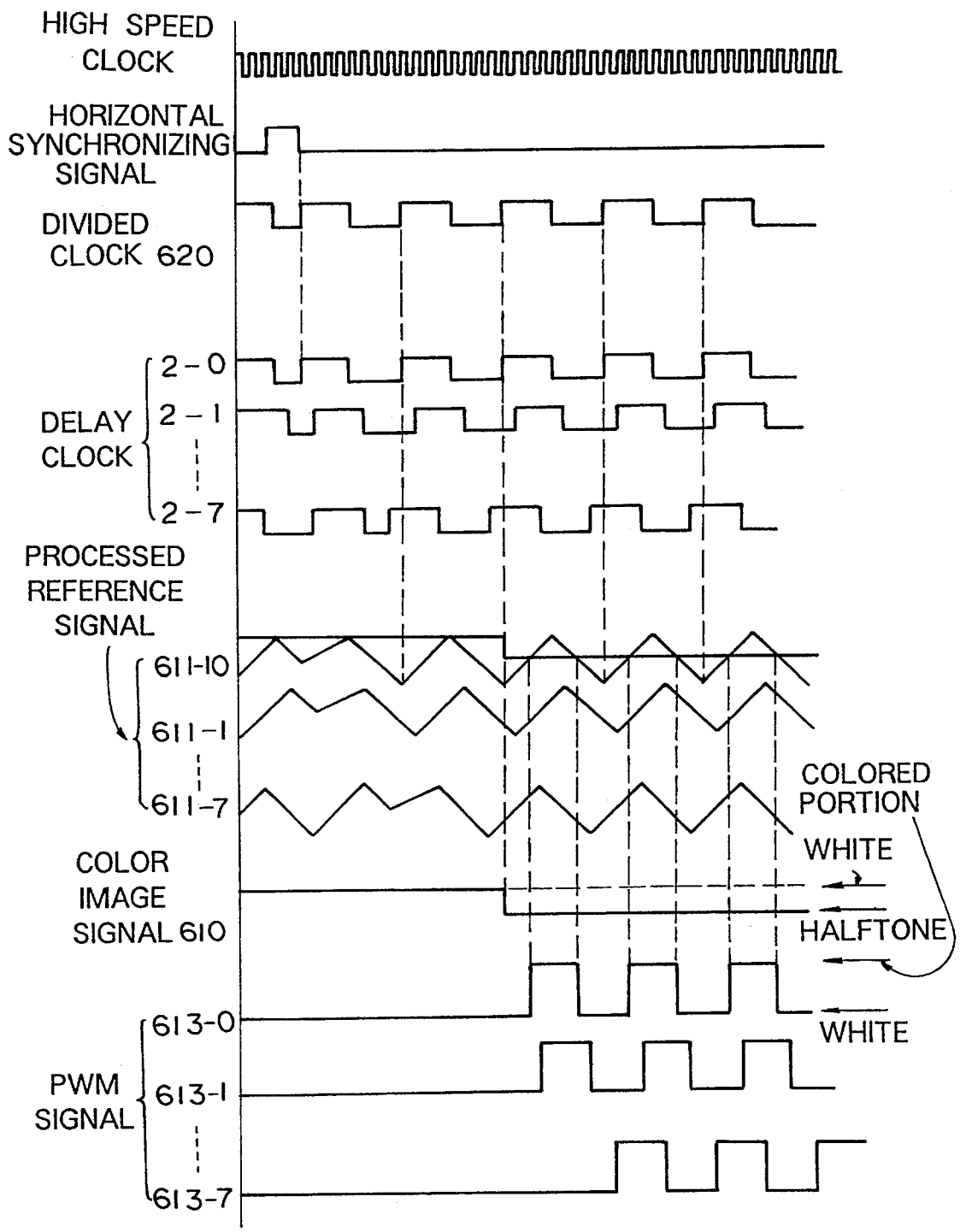
FIG. 48 is a timing chart which illustrates the timing of a signal according to the fifth embodiment of the present invention.

Then, a counter 606 is a 3-bit counter which counts the horizontal synchronizing signal in such a manner that counting from "0" to "7" is repeated. In accordance with the result of counting performed by the counter 606, the pattern generator 604 successively transmits the selection patterns to the selector 603 so that one delay clock is selected. Then, the delay clock selected by the selector 603 is supplied to a pulse pattern generator 609 before a reference signal in the form of the triangular wave as shown in FIG. 48 is transmitted. When, for example, the delay clock 2-0 is supplied to the pulse pattern generator 609, a triangular wave 11-0 is formed.

On the other hand, a digital color image signal (anyone of Y, M, C and Bk) is converted into an analog signal 610 by a D/A converter 607 shown in FIG. 47. Then, the above-described reference signal (triangular wave) 611 and the color image signal 610 are subjected to a comparison by a comparator 608. As a result, a PWM signal 613 is transmitted.

Figure 49:
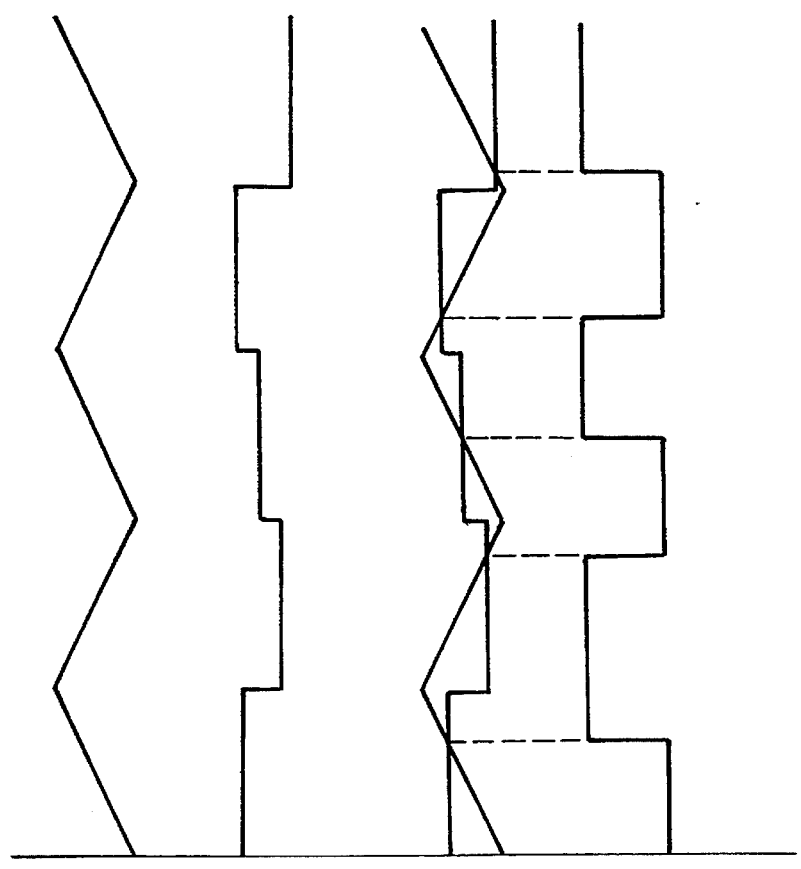
FIG. 49 illustrates the pulse width modulation signal obtainable according to the fifth embodiment of the present invention.
Figure 50B:
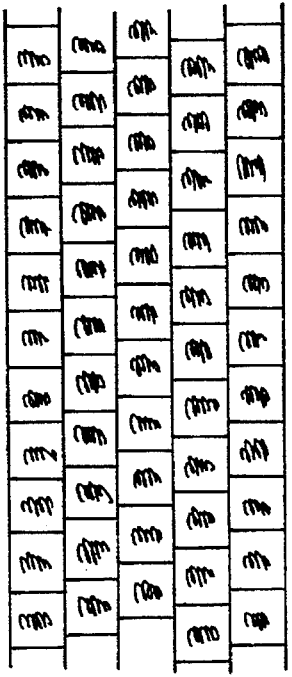
FIGS. 50A to 50D illustrate output patterns after the pulse width modulations performed to correspond to each color according to the fifth embodiment of the present invention.
Figure 50D:
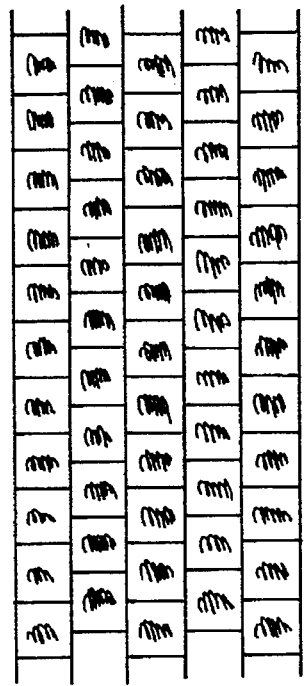
Figure 50A:
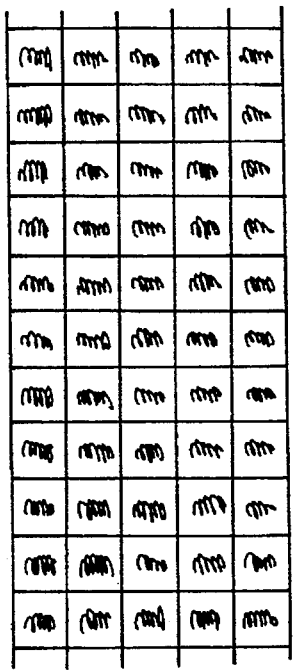
Figure 50C:
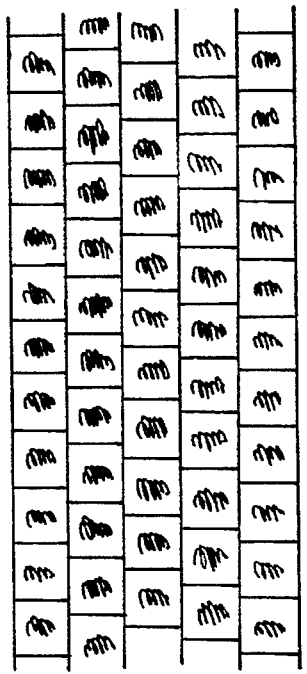

FIG. 49 illustrates a state in which the PWM signal 613 is formed as a result of the comparison made by the comparator 8.

As described above, irregular color and color tone change for each print due to the problems taken place in the color laser printer can be prevented, the problems being exemplified by the irregular rotation of the motor for the polygonal mirror, the deviation of the resistance for each of the colors and the irregular speed of the paper conveyance system. Furthermore, the image quality can always be stabilized.

According to this embodiment, the four selection patterns are written in the pattern generator 604. However, a random circuit or the like may be employed to form the selection patterns different for each of the four colors.

The delay of each of the output patterns of Y, M, C and Bk shown in FIGS. 46A to 46D are arranged in such a manner that Y: 1/4 pixel, M: 2/4 pixel, C: 7/4 pixel and Bk: 4/4 pixel. However, another type of the delay may be employed, for example, Y: 2/4 pixel, M: 1/4 pixel, C: 4/4 pixel and Bk: 7/4 pixel, resulting the similar effect to be obtained.

Furthermore, any four types of the combinations of the delay of the pixel may be selected from 8 combinations of "0/4 to 7/4" pixels.

The description is made about the structure shown in FIGS. 46A to 46D in which one unit is arranged to be composed of two pixels. One unit may be composed of a number of pixels other than two. In a case where one unit is composed of one pixel, the delay becomes, as shown in FIGS. 50A to 50D, four combinations of the delay of 0/4 to 3/4 pixels.

The method of the delay is arranged to be the period for every four lines in the case of the structure shown in FIGS. 50A to 50D. In the case of the structure shown in FIGS. 46A to 46D, the period becomes 8 lines. The reason for this lies in that the delay quantity is in units of 1/4 pixel. However, since the delay can be varied depending upon the method of dividing the clock, the unit of the delay can be made to be 1/2 pixel by dividing the clock by $2^n$ (where n is an integer).

Furthermore, since the delay quality can be arranged in units of less than one pixel the image formation can be performed by various screen angles in case of comparing with the delay quality in units of 1 pixel.

As described above, according to the present invention, the delay quantity is varied for each line and the delay quantity is varied for each of the colors. As a result, the irregular color and the color tone change for each print can be prevented.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A color image processing apparatus for forming a color image comprising at least three color components, said image processing apparatus comprising:

input means for inputting image data for each of the color components; and image forming means for frame sequentially forming an image of each of the color components in accordance with the inputted image data;

wherein at least one of a first and a last image formed of one of a first of said at least three color components has a first screen angle, wherein two images respectively formed of at least a second and third of said at least three color components have a common second screen angle, and wherein the first screen angle is different from the second screen angle.

2. A color image processing apparatus according to claim 1, wherein said input means inputs image data for each of the color components and transmits inputted image data in a raster successive manner, and wherein said image forming means comprises:

a pattern signal generator for generating a predetermined pattern signal;

a PWM signal generator for generating a pulse width modulated (PWM) signal in accordance with the pattern signal and the image data for each of the color components; and an image forming unit for forming an image in accordance with said PWM signal.

3. A color image processing apparatus according to claim 2, wherein said pattern signal generator generates a plurality of pattern signals having different phases and wherein said pattern signal generator shifts a phase of each of the pattern signals by a predetermined quantity for each of a plurality of lines so that an image is formed at a screen angle corresponding to the predetermined quantity.

4. A color image processing apparatus according to claim 2, wherein said pattern signal generator generates the predetermined pattern signal one period of which corresponds to a plurality of pixels.

5. A color image processing apparatus according to claim 1, wherein said image forming means forms the image for each of the color components at different screen angles from each other by shifting a position of dots for each of a plurality of lines by a shifting quantity, a unit of which is smaller than one pixel, the shifting quantity being different for each of the color components.

6. A color image processing apparatus according to claim 2, wherein said pattern signal generator generates a triangular wave signal as the predetermined pattern signal.

7. A color image processing apparatus according to claim 3, wherein said pattern signal generator comprises:

a reference pattern signal generating unit for generating a reference pattern signal;

a delay circuit for outputting a plurality of pattern signals having different phases by delaying the reference pattern signal; and a selector for selecting one pattern signal from said plurality of pattern signals having different phases so as to supply the one pattern signal to said PWM signal generator.

8. An apparatus according to claim 1, wherein said apparatus forms one dot corresponding to more than one pixel in a single main-scanning line of the input image data, and wherein said apparatus shifts a line directional position of dots line by line, a quantity by which the line directional position of dots is shifted being settable smaller than one pixel of the inputted image data.

9. A color image processing apparatus according to claim 8, wherein said input means inputs the image data for each of the color components which is transmitted in a raster successive manner, and wherein said image forming means comprises:

a pattern signal generator for generating a predetermined pattern signal;

a PWM signal generator for generating a pulse width modulated (PWM) signal in accordance with the pattern signal and the image data for each of the color components; and an image forming unit for forming an image in accordance with the PWM signal.

10. A color image processing apparatus according to claim 9, wherein said pattern signal generator generates a plurality of predetermined pattern signals having respectively different phases and wherein said image forming means shifts the line directional position of dots by shifting a phase of at least one of said plurality of pattern signals generated by said pattern signal generator.

11. A color image processing apparatus according to claim 8, wherein said pattern signal generator generates a pattern signal one period of which corresponds to a plurality of pixels.

12. An apparatus according to claim 1, wherein said apparatus forms a color image composed of at least four color components, and wherein said image forming means makes the first screen angle for a color component whose image is formed first, a third screen angle for a color component whose image is formed last, and the second screen angle for others of said at least four color components, each to be different from one another.

13. An apparatus according to claim 2, wherein said pattern signal generator shifts positions of dots on a line by changing a phase of the predetermined pattern signal in accordance with a line to be recorded, and wherein said pattern signal generator generates the predetermined pattern signal of which a period corresponds to more than one pixel in a single main-scanning line of the inputted image data, and wherein a shifting quantity of the positions of the pattern signal generator is settable smaller than one pixel of the inputted image data.

14. An apparatus according to claim 13, wherein said apparatus forms one dot corresponding to the inputted image data for a plurality of pixels.

15. An apparatus according to claim 13, wherein said apparatus forms an image in response to the PWM signal.

16. An apparatus according to claim 13, wherein said pattern signal generator changes the phase of the predetermined pattern signal in accordance with a color component and a line to be recorded.

17. An apparatus according to claim 16, wherein said pattern signal generator generates a plurality of predetermined pattern signals having respectively different phases and wherein said pattern signal generator shifts a phase of each of the predetermined pattern signals by a predetermined quantity for each of a plurality of lines so that an image is formed at a screen angle corresponding to the predetermined quantity.

18. An apparatus according to claim 16, wherein said pattern signal generator generates a predetermined pattern signal one period of which corresponds to a plurality of pixels.

19. A color image processing apparatus for transmitting image data to an image forming apparatus which frame-sequentially forms an image of the each of plural color components, comprising:

processing means for processing the image data so as to shift a position of dots to be formed line by line for each of plural scanning lines; and transmitting means for transmitting the processed image data to the image forming apparatus in a raster successive order;

wherein said transmitting means transmits the image data comprising at least three color components, and wherein said processing means processes image data for at least one of a first and a last one of the color components to be transmitted so as to form an image having a first screen angle, and processes image data for at least two of remaining ones of the color components so as to form images having a common second screen angle which is different from the first screen angle.

20. An apparatus according to claim 19, further comprising:

a pattern signal generator for generating a predetermined pattern signal, a phase of which is shifted by a predetermined quantity for each scanning line so that an image is formed at a screen angle corresponding to the shifted quantity; and a PWM signal generator for generating a pulse width modulated (PWM) image data in accordance with the pattern signal and a pixel density level of each of the color components.

21. An apparatus according to claim 20, wherein said pattern signal generator generates the predetermined pattern signal of which one period corresponds to a plurality of pixels.

22. An apparatus according to claim 20, wherein said pattern signal generator generates a triangular wave signal as the predetermined pattern signal.

23. An apparatus according to claim 20, wherein said pattern signal generator comprises:

a reference pattern signal generating unit for generating a reference pattern signal;

a delay circuit for delaying the reference pattern signal and outputting a plurality of pattern signals having different phases; and a selector for selecting one pattern signal from said plurality of pattern signals having different phases so as to supply the one pattern signal to said PWM signal generator.

24. An apparatus according to claim 19, wherein said apparatus forms a color image composed of at least four color components, and wherein said apparatus makes the first screen angle for a color component whose image is formed first, a third screen angle for a color component whose image is formed last, and the second screen angle for others of the at least four color components, each to be different from one another.

25. An apparatus according to claim 19, wherein said apparatus forms one dot corresponding to more than one pixel in a single main-scanning line of the input image data, and wherein said apparatus shifts a line directional position of dots line by line, a shifting quantity being settable smaller than one pixel of the inputted image data.

26. An apparatus according to claim 19, wherein said pattern signal generator shifts positions of dots on a line by changing a phase of the predetermined pattern signal in accordance with a line to be recorded, and wherein said pattern signal generator generates the predetermined pattern signal of which a period corresponds to more than one pixel in a single main-scanning line of the input digital image data, and wherein a shifting quantity of the positions in the pattern generator is settable smaller than one pixel of the inputted digital signal.

* * * * *

UNITED STATES PATENT AND TRADEMARK OFFICE
CERTIFICATE OF CORRECTION

PATENT NO. : 5,469,266

DATED : November 21, 1995

INVENTOR(S) : Akihiro Usami, et al.

It is certified that error appears in the above-identified patent and that said Letters Patent is hereby corrected as shown below:

COLUMN 1:

Line 30, "S1Y" should read --51Y--.

COLUMN 15:

Line 32, "order to" should read --order to form--.

COLUMN 18:

Line 13, "performed for each of the" should be deleted;
　　Lines 14 through 37 should be deleted;
　　Line 38, "arranged to be '0' for all of the lines." should be deleted; and

UNITED STATES PATENT AND TRADEMARK OFFICE
CERTIFICATE OF CORRECTION

PATENT NO. : 5,469,266

DATED : November 21, 1995

INVENTOR(S): Akihiro Usami, et al.

It is certified that error appears in the above-identified patent and that said Letters Patent is hereby corrected as shown below:

Line 63, "is" should read --is performed for each of the color components so that the colors are overlapped.
FIGs. 30A to 30D are waveform drawings which illustrate examples of the reference signal (triangular wave) for M, C, Y and Bk. The triangular signals for use at the time of forming an image of Magenta (M) has, as shown in FIG. 30A, a referential period (two pixels) serving as a reference. Therefore, it is generated at a quantity of delay $D_M$=degree corresponding to 0 pixel for the first line, at a delay quantity $D_M$=degree corresponding to 2/4 pixel for the second line, at a delay quantity $D_M$=degree corresponding to 4/4 pixel for a third line and at a delay quantity $D_M$=degree corresponding to 6/4 pixel for the fourth line (the delay quantities $D_M$ from the fifth line employ the repeated delay quantities for the first to the fourth lines). The positions of the dot to be recorded in response to the reference signal are designated by symbol "O" in FIG. 31A.
The triangular signal for use at the time of forming the Cyan (C) image has a reference period (two pixels) so that the delay quantity Dc for each of the first to the fourth lines is arranged to be 0, 6/4, 4/4 and 2/4.
The triangular signal for use at the time of forming the Yellow (Y) image has a period (three pixels) which is 1.5 times the reference period. The delay quantity $D_y$ is arranged to be "0" for all of the lines.--

UNITED STATES PATENT AND TRADEMARK OFFICE
CERTIFICATE OF CORRECTION

PATENT NO. : 5,469,266

DATED : November 21, 1995

INVENTOR(S) : Akihiro Usami, et al.

It is certified that error appears in the above-identified patent and that said Letters Patent is hereby corrected as shown below:

COLUMN 23:

Line 28, "cl Fifth" should be deleted;
    Line 29, "Embodiment" should read --Fifth Embodiment--; and
    Line 44, "amplifier 1" should read --amplifier 601--.

Signed and Sealed this

Tenth Day of September, 1996

Attest:

BRUCE LEHMAN

Attesting Officer     Commissioner of Patents and Trademarks